(12) United States Patent
Tse et al.

(10) Patent No.: US 8,519,530 B2
(45) Date of Patent: *Aug. 27, 2013

(54) METHOD FOR TREATING NANOFIBER MATERIAL AND COMPOSITION OF NANOFIBER MATERIAL

(75) Inventors: Ka Chun Tse, Hong Kong (CN); Ben Zhong Tang, Hong Kong (CN); Ernst Hammel, Vienna (AT); Xinhe Tang, Vienna (AT)

(73) Assignee: Curamik Electronics GmbH, Eschenbach (DE)

( * ) Notice: Subject to any disclaimer, the term of this patent is extended or adjusted under 35 U.S.C. 154(b) by 1227 days.

This patent is subject to a terminal disclaimer.

(21) Appl. No.: 11/992,649

(22) PCT Filed: Aug. 17, 2006

(86) PCT No.: PCT/IB2006/003056
§ 371 (c)(1),
(2), (4) Date: Feb. 13, 2009

(87) PCT Pub. No.: WO2007/036805
PCT Pub. Date: Apr. 5, 2007

(65) Prior Publication Data
US 2009/0142545 A1 Jun. 4, 2009

(30) Foreign Application Priority Data

| Sep. 27, 2005 | (DE) | 10 2005 046 262 |
| Dec. 23, 2005 | (DE) | 10 2005 062 182 |
| Jul. 13, 2006 | (DE) | 10 2006 032 688 |
| Aug. 9, 2006 | (DE) | 10 2006 037 185 |

(51) Int. Cl.
*H01L 23/10* (2006.01)
*H05K 7/00* (2006.01)
*B32B 5/12* (2006.01)

(52) U.S. Cl.
USPC ............ 257/706; 257/717; 257/712; 428/75; 428/107; 428/323; 428/407; 361/704; 361/705; 361/707; 361/708; 361/709; 361/712; 361/713; 174/259

(58) Field of Classification Search
USPC ........... 428/323, 75, 107, 407; 361/704–709, 361/712, 713; 257/706–707, 712, 717; 174/259
See application file for complete search history.

(56) References Cited

U.S. PATENT DOCUMENTS

| 4,568,592 A * | 2/1986 | Kawaguchi et al. ......... 428/107 |
| 5,281,771 A * | 1/1994 | Swift et al. ................ 174/262 |
| 6,926,955 B2 * | 8/2005 | Jayaraman et al. ......... 428/323 |
| 6,947,285 B2 * | 9/2005 | Chen et al. ................ 361/708 |
| 8,119,220 B2 * | 2/2012 | Tang et al. ................ 428/114 |
| 8,304,054 B2 * | 11/2012 | Tang et al. ................ 428/114 |

FOREIGN PATENT DOCUMENTS

| DE | 60033692 | 11/2007 |
| JP | 2002034961 | 2/2002 |

(Continued)

*Primary Examiner* — Cathy Lam
(74) *Attorney, Agent, or Firm* — Welsh Flaxman & Gitler LLC

(57) ABSTRACT

Disclosed is a composition, in particular a dispersion, which contains nanofiber material in at least one organic matrix component, said nanofiber material being pre-treated in at least one method step for adjusting the physical properties of the composition.

10 Claims, 15 Drawing Sheets

(56) References Cited

FOREIGN PATENT DOCUMENTS

| | | |
|---|---|---|
| JP | 2005-200732 | 7/2005 |
| WO | WO 02/075018 | 9/2002 |
| WO | WO03/087707 | 10/2003 |
| WO | WO 2004/102659 | 11/2004 |
| WO | WO 2004/114404 | 12/2004 |
| WO | WO 2005/028174 | 3/2005 |
| WO | WO 2005/040265 | 5/2005 |

* cited by examiner

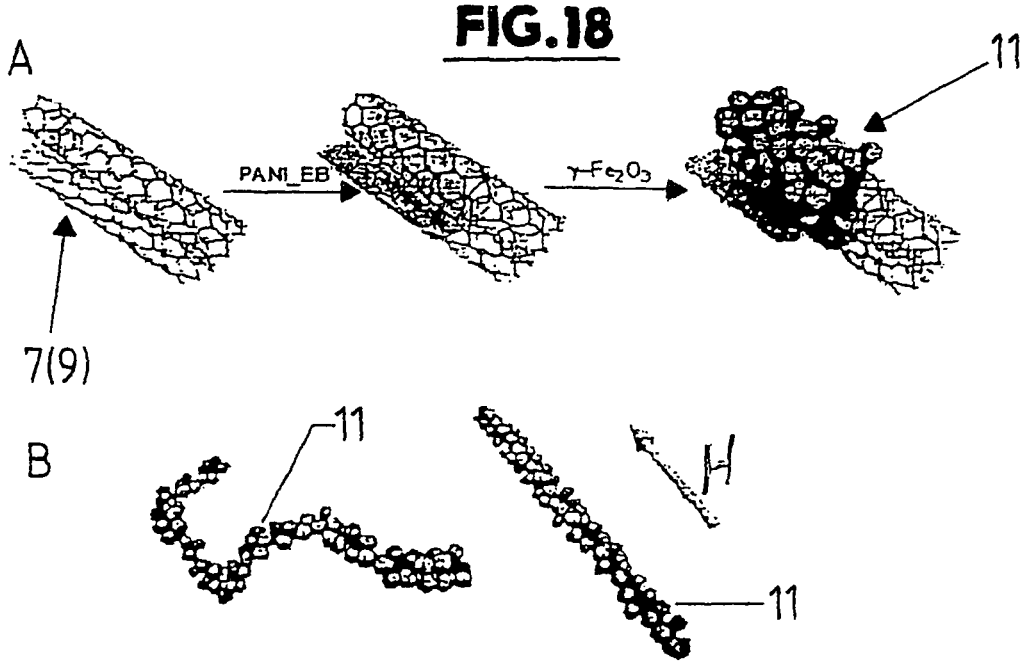
FIG. 18
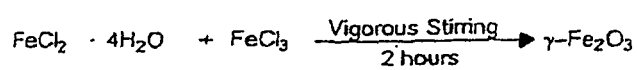
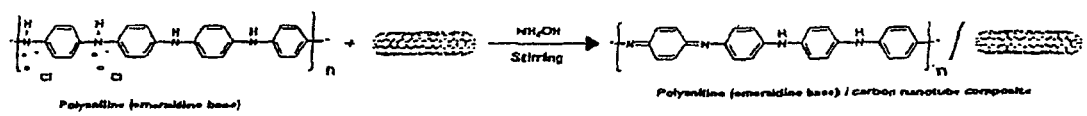
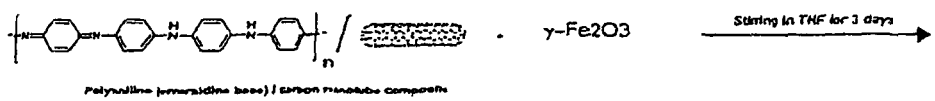
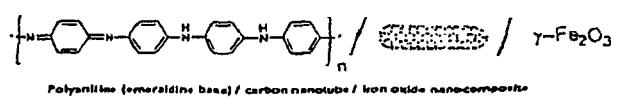
FIG. 19

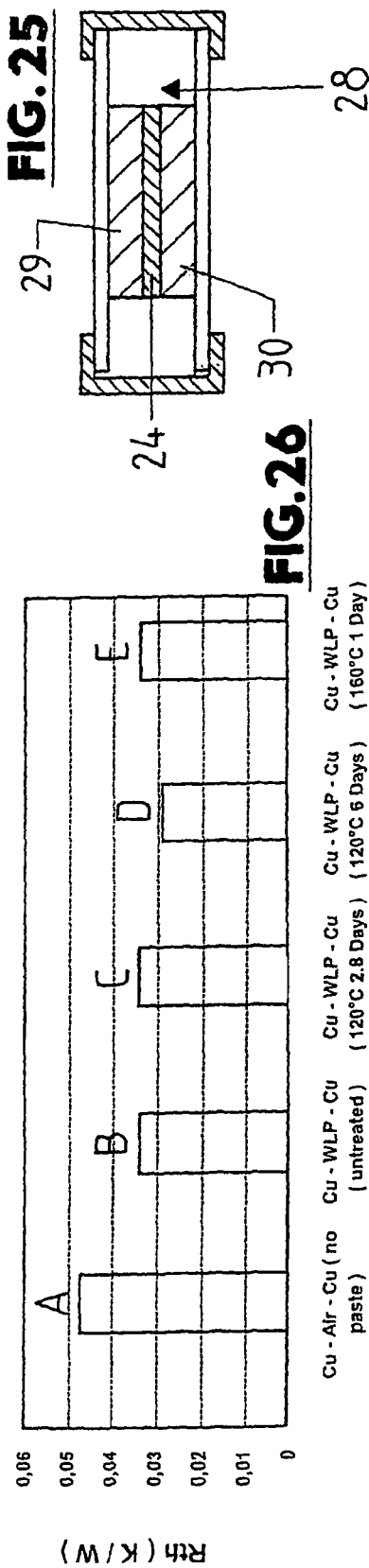
FIG. 25
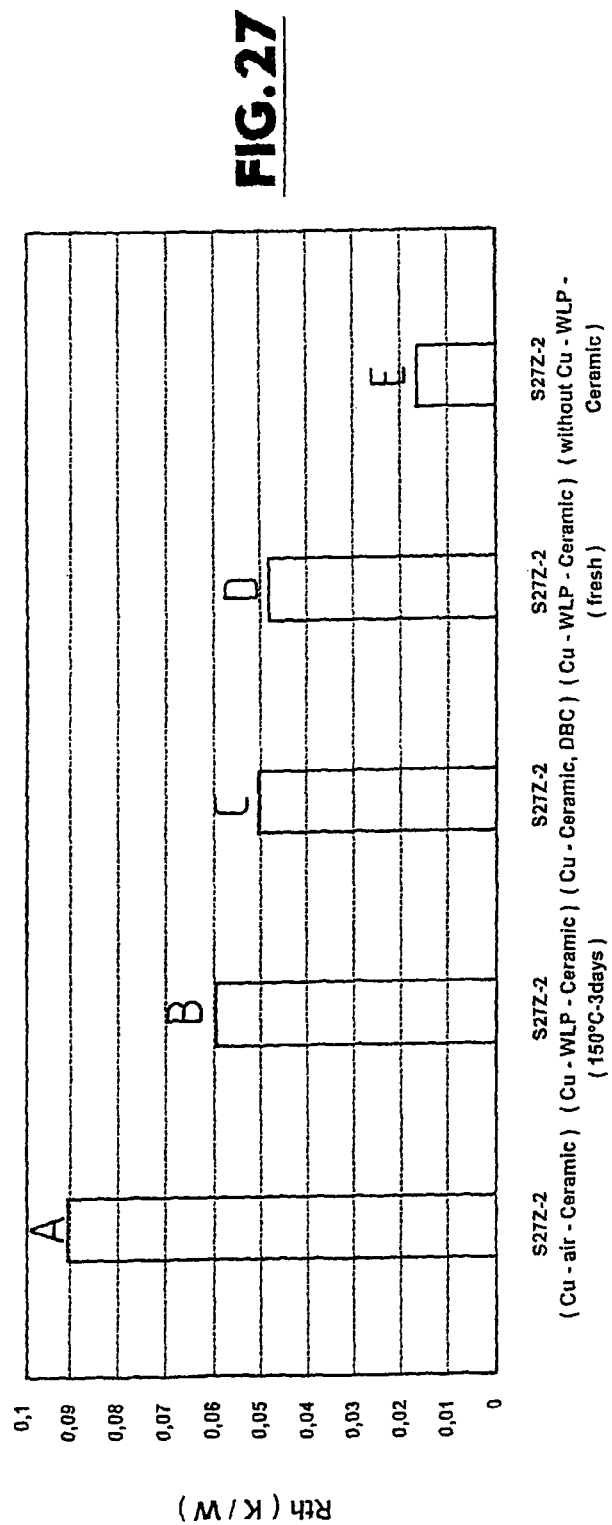
FIG. 26
FIG. 27

METHOD FOR TREATING NANOFIBER MATERIAL AND COMPOSITION OF NANOFIBER MATERIAL

BACKGROUND OF THE INVENTION

The invention relates to a method for treating nanofiber material and to a composition or dispersion made of nanofiber material.

Compositions or dispersions having improved thermal conductivity and/or having reduced thermal resistance, in particular also for use as thermal grease, and comprising a nanofiber material in an organic matrix, are known (WO 2004/114404).

"Nanofiber material" is understood in the meaning of the invention as nanotubes and/or in particular also nanofibers as well as mixtures made of nanotubes and nanofibers.

It is an object of the invention is to disclose a method for treating nanofiber material, in which this material is tailored optimally to the particular intended purpose in regard to its properties, in particular in regard to its physical and/or chemical properties.

Furthermore, it is an object of the invention is to disclose a composition which has improved physical and/or chemical properties in relation to known compositions which contain nanofiber material in an organic matrix.

SUMMARY OF THE INVENTION

In the invention, the nanofiber material is subjected to a pretreatment. This pretreatment includes a thermal pretreatment, for example, which is then followed by a further treatment, for example. During this pretreatment, in at least one method step a surface treatment of the nanofiber material is performed, for example, in such a manner that due to this surface treatment, improved, in particular also improved thermal bonding of the nanofiber material to the at least one matrix component forming the organic matrix results and in this manner the composition has an increased thermal conductivity and/or a reduced thermal resistance in particular also in an axial direction transverse to the longitudinal extension of the nanofibers or nanotubes. The surface treatment may also have multiple steps.

Additionally to or instead of this surface treatment, the pretreatment also comprises enclosing or enveloping a nanofiber material in a polymer or copolymer, to achieve special properties of the composition and/or to change the chemical and/or physical properties of the nanofiber material, for example, to improve the solubility or dispersibility of the nanofiber material in the organic matrix and thus to improve the stability of the composition. Inter alia, the nanofiber material may be prevented from settling on the container bottom in a container receiving the composition and/or the relevant product (e.g., thermal grease) by the improvement of the dispersibility, so that the product quantity taken from the container always contains the same proportion of nanofiber material.

The polymer or copolymer used for the envelope is selected in such a manner that the desired solubility and/or dispersibility is achieved thereby. In particular, those based on polyaniline are particularly suitable for the envelope.

For example, polyethylene glycol is suitable as the matrix component for the organic matrix. Other compounds are also suitable as matrix components. In particular if the composition is used as a thermal grease, this composition has a pasty or viscous consistency.

For example, those fibers which are sold under the name ENF-100-HT, HTP-150F-LHT, HTP-110FF-LHT, and HTP-110F-HHT by Electrovac GmbH, A-3400 Klostemeuburg, Austria, are suitable as the nanofibers.

Further nanofibers that are usable in the invention, which are also sold by Electrovac GmbH, A-3400 Klostemeuburg, Austria, are specified in following Table 1.

TABLE 1

| Nanofiber | Nanofiber type | N2 specific surface area [m²/g] | Diameter [nm] | Length [μm] | Thermal conductivity [W/mK] | Electrical resistance [Ohm/cm] | Metal content [wt.-%] | Density [g/cm³] |
|---|---|---|---|---|---|---|---|---|
| HTF150FF | AGF | 10-20 | 100-200 | >10 | >600 | $<10^{-3}$ | <0.5 | 1.95 |
| HTF150FF | PSF | 20-30 | 100-200 | >10 | >600 | $<10^{-3}$ | <0.5 | 1.95 |
| HTF150FF | LHT | 15-20 | 100-200 | >10 | >600 | $<10^{-3}$ | <0.5 | >1.95 |
| HTF150FF | HHT | 15-25 | 100-200 | >10 | >600 | $<10^{-3}$ | <0.01 | >1.95 |
| HTF110FF | AGF | 53 | 70-150 | >10 | >600 | $<10^{-3}$ | <0.5 | 1.95 |
| HTF110FF | PSF | 50-60 | 70-150 | >10 | >600 | $<10^{-3}$ | <0.5 | 1.95 |
| HTF110FF | LHT | 43 | 70-150 | >10 | >600 | $<10^{-3}$ | <0.5 | >1.95 |
| HTF110FF | HHT | 41 | 70-150 | >10 | >600 | $<10^{-3}$ | <0.01 | >1.95 |
| ENF100AA | HTE | 80-100 | 80-150 | >10 | >600 | $<10^{-3}$ | <0.5 | 1.98 |
| ENF100AA | GFE | >50 | 80-150 | >10 | >600 | $<10^{-3}$ | <0.01 | 2.17 |

Nanofiber type:

AGF as grown

PSF pyrolytic stripped carbon nanofiber

LHT baked at ~1000° C.

HHT baked at ~3000° C.

HTE baked at ~1000° C. with EVAC

GFE baked and/or graphitized at ~3000° C. with EVAC

Accordingly, the following abbreviations mean:

| Nanofiber type | Baked at |
| --- | --- |
| HTF150FF - LHT | Approximately 1000° C. |
| HTF150FF - HHT | Approximately 3000° C. |
| HTF110FF - LHT | Approximately 1000° C. |
| HTF110FF - HHT | Approximately 3000° C. |
| ENF 100 AA - HTE | Approximately 1000° C. |
| ENF 100 AA - GFE | Approximately 3000° C.-graphitized |
| ENF 100 HT | Approximately 1000° C. |

A cross-linked or cured plastic may also be used as the organic matrix component, in such a manner that the composition has a solid consistency or elastic properties.

Furthermore, the invention relates to a composite material, and in particular to a composite material comprising a ceramic layer and at least one metal plating or metal layer provided on this ceramic layer. The composite material is produced using the composition implemented as an adhesive or bonding material.

The production of composite materials as circuit boards in the form of metal-ceramic substrates according to the so-called DCB process is also known. For this purpose, the metal plating required for generating printed conductors, terminals, etc. is applied to a ceramic, e.g., to an aluminum-oxide ceramic, with the aid of the so-called "DCB method" (direct copper bond technology), using metal and/or copper films or metal and/or copper plates forming the metal plating, which have a layer or a topcoat (fused layer) on their surface sides made of a chemical compound made of the metal and a reactive gas, preferably oxygen.

In this method, described, for example, in U.S. Pat. No. 3,744,120 or in DE-PS 23 19 854, this layer or this topcoat (fused layer) forms a eutectic material having a melting temperature below the melting temperature of the metal (e.g. copper), so that by laying the film on a ceramic and heating all layers, the layers may be bonded to one another, specifically by using the metal and/or copper essentially only in the area of the fused layer or oxide layer.

This DCB method then has the following method steps, for example:
- oxidizing a copper film in such a manner that a uniform copper oxide layer results;
- laying the copper film on the ceramic layer;
- heating the composite to a processing temperature between approximately 1025 and 1083° C., e.g., to approximately 1071° C.;
- cooling to room temperature.

The so-called active solder method (DE 22 13 115; EP-A-153 618) is also known for bonding metal layers or metal films forming metal plating, in particular also copper layers or copper films, to the particular ceramic material. In this method, which is especially used for producing metal-ceramic substrates, a bond is produced between a metal film, such as copper film, and a ceramic substrate, such as an aluminum nitride ceramic, at a temperature between approximately 800-1000° C. using a hard solder, which also contains an active metal in addition to a main component, such as copper, silver, and/or gold. This active metal, which is a least one element of the group Hf, Ti, Zr, Nb, and Ce, for example, produces a bond between the solder and a ceramic by chemical reaction, while the bond between the solder and the metal is a metallic hard solder bond.

The composite material according to the invention is preferably a multilayer material and is more preferably a multilayer material suitable as a circuit board for electrical circuits, modules, etc., comprising a plate-shaped carrier or substrate comprising an electrically insulating material on at least one surface side as well as at least one metal plating formed by a metal or copper plate and/or metal or copper film, which is bonded to the substrate via the composite material.

The composite material according to the present invention has the advantage of simple and cost-effective manufacturing. Furthermore, a compensation for different coefficients of thermal expansion of the material of the metal plating and the substrate is achieved via the layer formed by the adhesive or bonding agent. In particular with appropriate orientation of at least a part of the nanofiber material in the bond layer parallel or approximately parallel to the bonded faces, an effect compensating for the thermal expansion of the metal plating may be achieved.

BRIEF DESCRIPTION OF THE DRAWINGS

The present invention is explained in greater detail in the following on the basis of exemplary embodiments and experimental results, also with reference to the figures.

FIG. 18 shows a schematic illustration of a partial length of a carbon nanofiber upon coating of this fiber with ferromagnetic particles (e.g., $Fe_2O_3$) and the orientation of the coated nanofiber in an external magnetic field H;

FIG. 19 shows the illustration of a method for coating the carbon nanofibers with ferromagnetic particles in the form of γ-$Fe_2O_3$;

FIG. 25 schematically shows a configuration for preparing different samples;

FIG. 26 shows the thermal resistance, measured on various samples;

FIG. 27 shows a comparison of the thermal resistance measured using the device of FIG. 24 for various material compounds and/or multilayer materials;

DETAILED DESCRIPTION OF THE INVENTION

Figure 1:
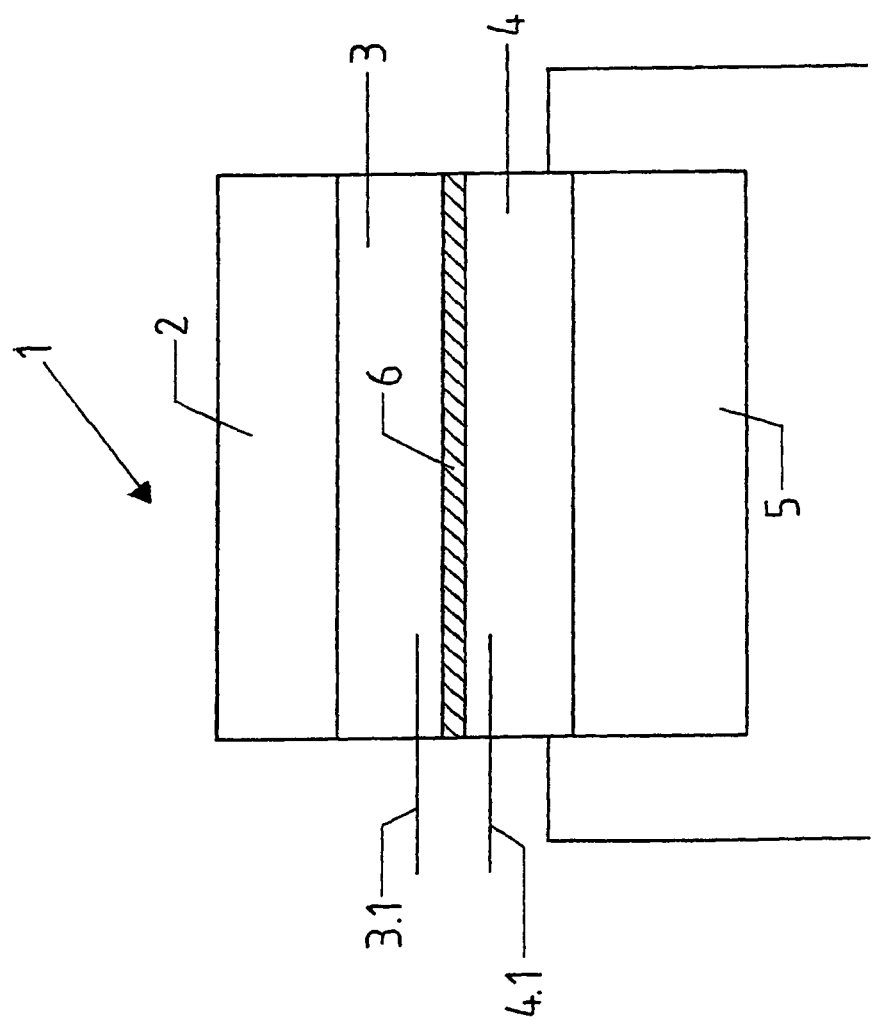
FIG. 1 shows a schematic illustration of the construction of the measuring configuration for measuring the thermal resistance $R_{th}$ of nanofiber material, i.e., of compositions containing nanofibers and/or nanotubes, also in the form of thermal greases.

The measuring configuration, identified in general in FIG. 1 by 1, for determining the thermal resistance $R_{th}$ of a composition, e.g., dispersion, which contains a nanofiber material and is particularly suitable for use as a thermal grease, essentially comprises an electrical heater 2 on a surface side of a first plate 3, comprising copper, a second plate 4, comprising copper, which is also implemented as a cooler having a coolant flowing through it, specifically water, and a damping device 5, using which the plate 4 may be clamped against the plate 3. Temperature sensors 3.1 and 4.1 are provided in the plates 3 and 4, respectively, specifically for measuring the temperature T1 of the plate 3 and the temperature T2 of the plate 4. The composition and/or dispersion to be measured is introduced between the two plates 3 and 4 as a layer 6.

The thermal resistance $R_{th}$ is defined as follows:

$R_{th}$(° K/W)=(T1−T2)/power of the heater in W.

The thermal conductivity is then $1/R_{th}$.

Figure 2:
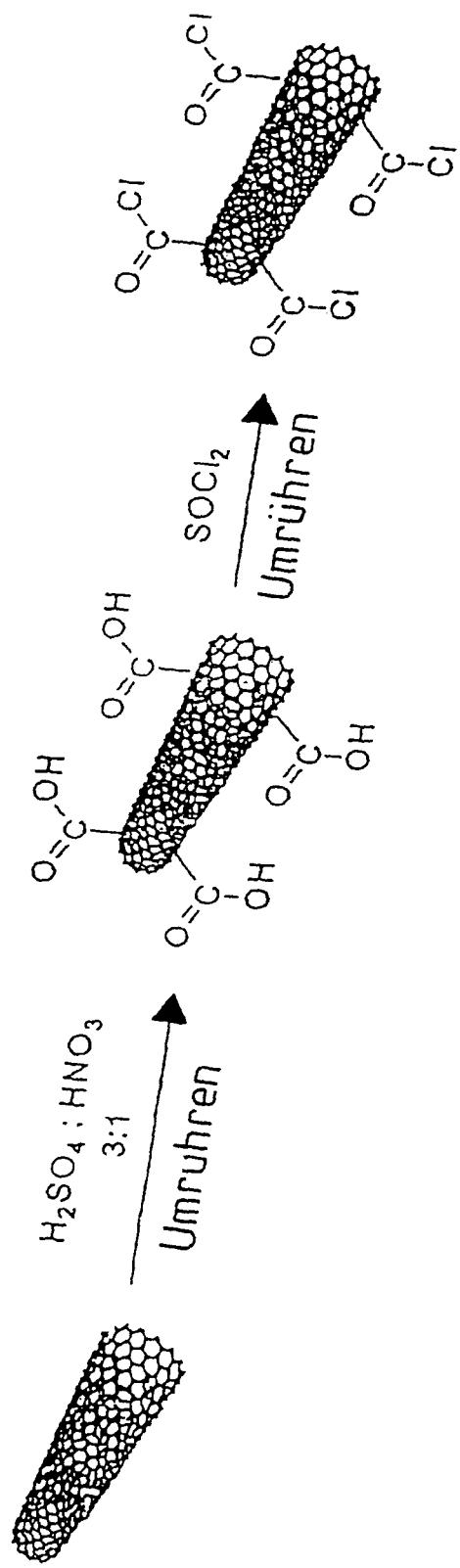
FIG. 2 shows the illustration of a method for a surface treatment of nanofibers before the mixing with an organic matrix component, namely polyethylene glycol (PEG)

In an embodiment, the pretreatment of the carbon-based nanofibers is performed in two steps as shown in FIG. 2. In a first step, the nanofibers are treated with continuous stirring in a mixture, which contains an inorganic acid, such as sulfuric acid ($H_2SO_4$) and hydrochloric acid ($HNO_3$) in a ratio 3:1, specifically to form carboxyl groups on the surface of the nanofibers. In a second step, a further treatment is performed in thionyl chloride (sulfuric acid chloride), by which the hydroxyl groups (OH groups) are each replaced by a chlorine atom in the carboxyl groups on the surface of the nanofibers. This pretreatment is also referred to in the following as TC pretreatment. This pretreatment is performed with continuous stirring. The total treatment time of this pretreatment is 1.5 hours, for example. The treatment time relates to the total time of the two method steps.

The nanofibers thus pretreated or surface-modified are then mixed with the components forming the organic matrix, for example, at a temperature above room temperature, for example, at a temperature of approximately 40° C. and under ultrasound. For example, polyethylene glycol is suitable as a matrix component. Other materials are also usable, such as ethylene glycol, NMP, THF, or DMF.

A significant reduction of the thermal resistance $R_{th}$ may be achieved by the pretreatment, as also proven by the measurement results reproduced below:

During a measurement, under the same conditions in each case, various samples were assayed using the measuring configuration of FIG. 1, which contained nanofibers in a PEG matrix and/or dispersion. Firstly, nanofibers of the type ENF-100-HT were used. In detail, during the measurements, various samples having non-pretreated nanofibers and having nanofibers which were pretreated in the manner described above (TC pretreatment) were assayed in regard to the thermal resistance $R_{th}$, their infrared transmission, and product stability.

In all measurements reproduced in the following, the heater 2 was operated using a voltage of 60 V and a current of 2.7 A. The contact pressure generated by the clamping unit 5 was 3 bar.

The sample 1 contained non-pretreated nanofibers and the samples 2-5 contained nanofibers which were pretreated in the above manner. The proportion of nanofibers was 5 wt.-% in the samples 1-3 and 10 wt.-% in the samples 4 and 5, each in relation to the total mass. The production of the samples 1-5 was performed in each case in an ultrasound bath using a treatment time of 30 minutes and at a temperature of 40° C.

TABLE 2

| Sample | Thermal resistance $R_{th}$ (° K/W) | Improvement in % |
|---|---|---|
| Sample 1 | 0.027 | |
| Sample 2 | 0.0207 | 29.85 |
| Sample 3 | 0.0186 | 45 |
| Sample 4 | 0.015 | 78.77 |
| Sample 5 | 0.0176 | 52.63 |

Multiple measurements were performed using each sample and/or composition. The values specified in preceding Table 2 for the thermal resistance $R_{th}$ are the mean values ascertained during these measurements.

The preceding Table 2 shows that a significant reduction of the thermal resistance $R_{th}$ and thus a significant improvement of the properties (thermal conductivity $1/R_{th}$) of a thermal grease formed by this composition are achieved by the TC pretreatment of the nanofibers in relation to a composition which contains these fibers without the TC pretreatment.

The reduction of the thermal resistance $R_{th}$ and/or the increase of the thermal conductivity $1/R_{th}$ are to be attributed, according to a finding on which the invention is based, to an improved incorporation of the nanofibers in the matrix and/or an improved dispersion with the PEG matrix resulting through the TC pretreatment and/or through the carboxyl groups or COCl groups thus formed on the surface of the nanofibers, the carboxyl groups or COCl groups thus form bonding or coupling structures which cause this improved incorporation and/or improved dispersion. In this manner, inter alia, the heat transport via the nanofibers is also improved transversely to their longitudinal extension, which is of great significance especially in thermal greases, which are typically applied as thin layers, because in such layers the nanofibers are preferably oriented having their longitudinal extension in an axial direction transverse to the axial direction in which the heat transfer occurs.

Figure 3:
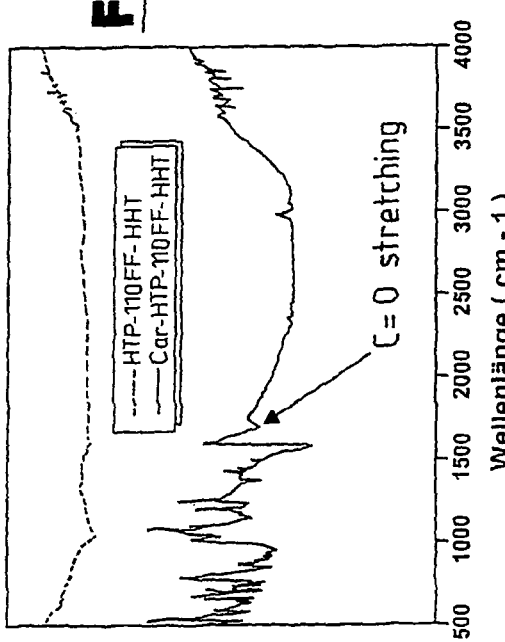
FIG. 3 shows the infrared or heat transmission as a function of the wavelength if surface-treated nanofiber material in the form of nanofibers is used in comparison to the use of untreated nanofiber material in the composition, specifically on the example of the nanofiber ENF-100HT.

FIG. 3 shows the infrared transmission resistance of samples which contained nanofibers of the type ENF-100HT in the PEG matrix at a proportion of 5 wt.-%, again in relation to the total weight of the sample. The curve A shows the curve for nanofibers which were not surface-treated or pretreated, and the curve B shows the curve for a composition having nanofibers which were subjected to the TC pretreatment described above. The curve of the two curves A and B also confirms that, inter alia, an adjustment of the thermal behavior of the composition, in particular a significant reduction of the thermal resistance $R_{th}$, is achievable by the pretreatment.

Figure 4:
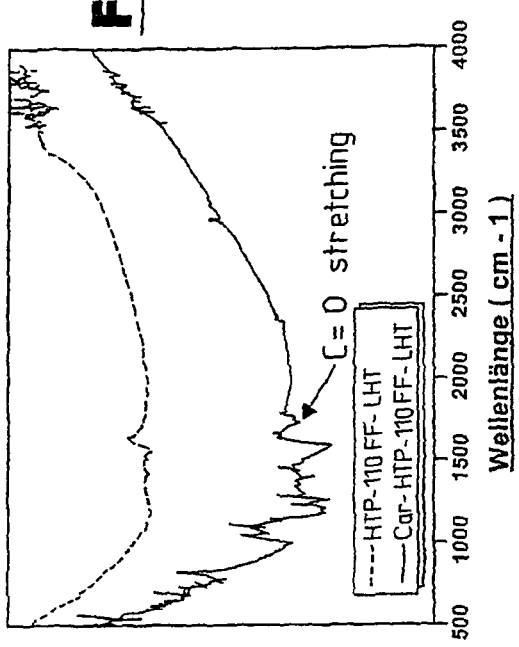
FIGS. 4-6 show illustrations like FIG. 3, but using nanofibers HTP-110FF-HHT, HTP-110FF-LHT, or HTP-150FF-LT.
Figure 5:
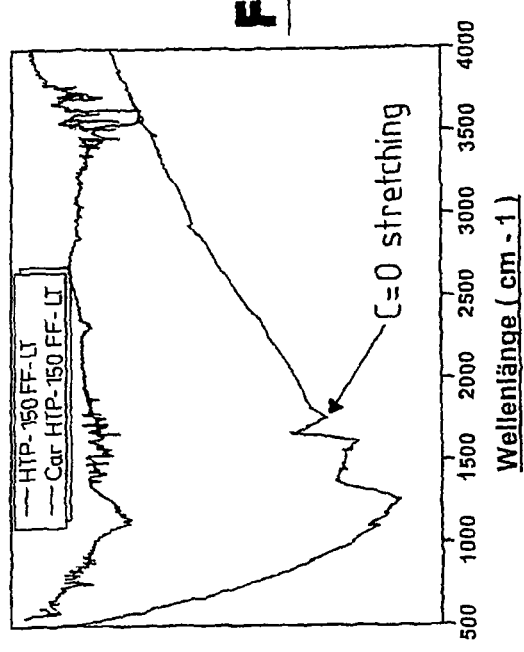
Figure 6:
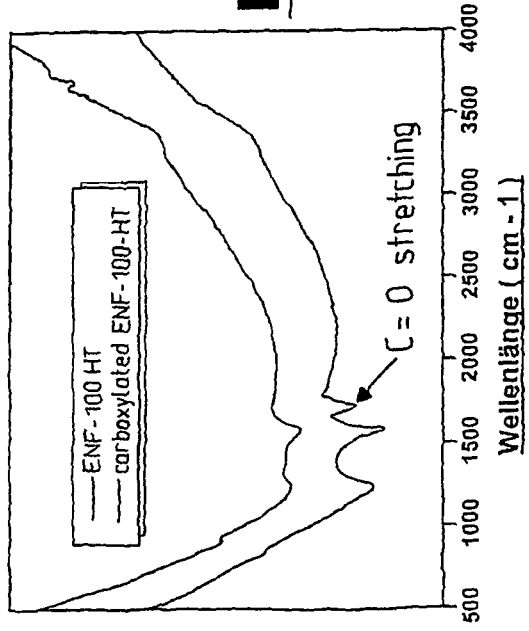

It was assumed above that the nanofibers used are those which are obtainable under the identification ENF-100-HT. As the graphs of FIGS. 4-6 show, a significant reduction of the infrared transmission resistance and/or a significant increase of the infrared transmission and thus a significant reduction of the thermal resistance $R_{th}$ also results in other nanofibers through the TC treatment, specifically in comparison to the use of untreated nanofibers.

Before the surface treatment and/or modification described above, the nanofibers or the nanofiber material were subjected to a heat treatment at least 2000° C., preferably at a temperature greater than 2000° C., to remove or vaporize the catalyst used during the production of the nanofiber material and to orient the graphite fibers, inter alia. Only in this manner is the previously described surface treatment or modification possible, i.e., in particular the carboxylation or formation of the carboxyl groups. Furthermore, the graphitization may be improved by the heat treatment.

FIGS. 4-6 again show, in the curve A, the curve of the infrared transmission resistance as a function of the wavelength for non-pretreated nanofibers and, in the curve B, the curve with pretreated nanofibers, specifically for nanofibers of the type HTP-150FF-LHT (FIG. 4), HTP-110FF-LHT (FIG. 5), and HTP-110FHH (FIG. 6), the different nanofibers requiring different times for the pretreatment:

TABLE 3

|  | Nanofiber | | | |
| --- | --- | --- | --- | --- |
|  | ENF-100-HT | HTP-150FF-LHT | HTP-110FF-LHT | HTP-110F-HHT |
| Treatment time in hours | 1.5 | 18 | 11 | 11 |

The thermal resistances of various samples, which each contained the same proportion of nanofibers in non-pretreated or in pretreated form in a PEG matrix, are again summarized for the various nanofibers in following Table 4:

TABLE 4

| Nanofiber material and/or nanofibers | Thermal resistance $R_{th}$ (° K/W) nanofibers without TC pretreatment | $R_{th}$ (° K/W) nanofibers with TC pretreatment | Improvement in % in relation to non-pretreated |
| --- | --- | --- | --- |
| HTP-110FF-HHT | 0.0136 | 0.0133 | 2.33 |
| HTP-110FF-LHT | 0.0157 | 0.0149 | 5.44 |
| HTP-150FF-LT | 0.0163 | 0.0130 | 25.17 |
| ENF-100-HT | 0.0270 | 0.0208 | 29.85 |

Notwithstanding the embodiments described above, the possibility also exists of retreating the nanofiber material using iodine in toluene or methyl benzene, with stirring at a treatment time of 14 days, for example. Nanofiber material pretreated and/or doped with iodine ($I_2$-doped) in this manner again results, in dispersion with a suitable organic matrix material, for example, with PEG, in a composition particularly suitable for use as a thermal grease having a greatly reduced thermal resistance $R_{th}$.

Measurements resulted, for example, for a composition which contained 5 wt.-% of the nanofibers pretreated with iodine in toluene of the type ENF-100-HT in a PEG matrix, in a reduction of the thermal resistance $R_{th}$ of nearly 60% in relation to a corresponding composition which contains the same proportion of nanofibers in non-pretreated form in the PEG matrix.

Corresponding comparative measurements are summarized in the following Table 5, this table relating to compositions which contained 5 wt.-% (in relation to the total weight of the composition) of nanofibers of the type ENF-100-HT in the PEG matrix and in which the components were treated and/or mixed using a treatment time of 30 minutes at 40° C. in an ultrasound bath.

TABLE 5

|  | $R_{th}$ (° K/Wt) | Improvement |
| --- | --- | --- |
| Untreated | 0.027 |  |
| TC pretreatment | 0.0208 | 29.85 |
| Iodine-toluene pretreatment | 0.0170 | 58.15 |

Both previously described methods of the pretreatment have advantages in comparison, but also disadvantages. Thus, the TC pretreatment offers the advantage of a relatively rapid reaction and thus allows a short treatment time. However, the materials used for the pretreatment are aggressive, so that the danger of corrosion and injury exists.

The iodine pretreatment results in significantly better results, in particular in regard to the reduction of the thermal resistance $R_{th}$, and is also user-friendly. However, this method has the disadvantage of the significantly longer reaction time or treatment time in comparison to the TC pretreatment.

Furthermore, the invention provides enveloping the nanofiber material during the pretreatment using at least one component and/or using a polymer or copolymer to achieve special physical and/or chemical properties for the composition.

For example, an envelope based on polyaniline is suitable as the envelope. The envelope may be implemented in greatly varying ways, for example, corresponding to FIG. 7 in that the surface-treated (using TC pretreatment) nanofibers are mixed with ES (emeraldine salt) and then the envelope is generated directly on the nanofibers by polymerization using hydrochloric acid and ammonium persulfate as the polymerization catalysts.

Fundamental advantages of this procedure are, inter alia, the possibility of purification and cost-effective manufacturing as well as a short treatment time. Experiments have shown that in spite of the envelope, the reduction of the thermal resistance $R_{th}$ achieved by the TC pretreatment of the nanofibers is retained.

In the following Table 6, the thermal resistance $R_{th}$ (° K/Wt) is specified for various samples, the samples 1-3 each containing 5 wt.-% nanofibers in relation to the total weight in the PEG matrix, and in all samples the nanofibers having been mixed with the PEG (polyethylene glycol) for 30 minutes at 40° C. in an ultrasound bath to produce the dispersion. In sample 4, the proportion of nanofibers was 10 wt.-%.

Figure 7:
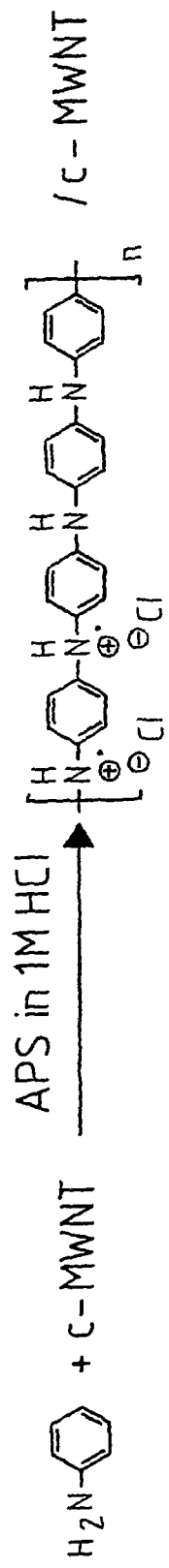
FIG. 7 shows a method for applying an envelope based on polyaniline to the nanofiber material.

Furthermore, sample 1 again relates to the composition or dispersion having non-pretreated nanofibers, sample 2 to a dispersion having nanofibers enveloped as shown in FIG. 7, however without TC pretreatment. Samples 3 and 4 relate to compositions having those nanofibers which were pretreated (TC pretreatment) according to FIG. 2 and subsequently enveloped according to FIG. 7.

TABLE 6

| Sample | Thermal resistance $R_{th}$ (° K/Wt) | Improvement in % |
|---|---|---|
| Sample 1 | 0.027 | |
| Sample 2 | 0.0251 | 7.408 |
| Sample 3 | 0.0204 | 31.82 |
| Sample 4 | 0.0195 | 38.09 |

Preceding Table 6 proves that the reduction of the thermal resistance $R_{th}$ achieved by the TC pretreatment of the nanofibers is not only retained by the envelope using the polymer based on polyaniline, but rather is even increased by this envelope. However, the nanofibers encased in this form are insoluble or are only inadequately soluble in the PEG matrix, so that a stable product is not possible using the nanofibers encased or enveloped in this manner.

In contrast to a product which has nanofibers which are surface-treated but not enveloped using polyaniline and thus has an essentially black color, the color of the composition which contains the nanofibers enveloped according to FIG. 7 is dark green. Other colors are also fundamentally possible if other polymers or copolymers are used for enveloping or enclosing the nanofiber material, without the desired reduction of the thermal resistance $R_{th}$ thus being impaired.

Figure 8:
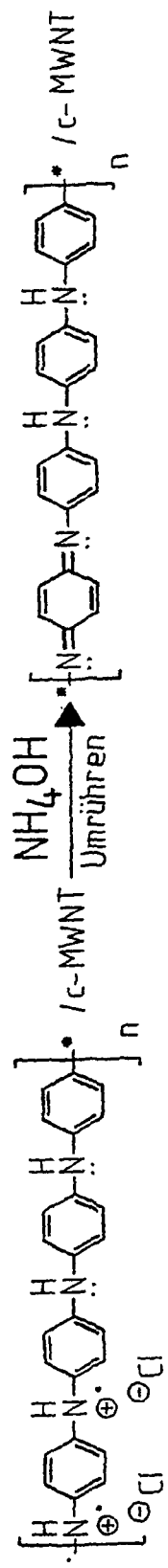
FIG. 8 shows an illustration like FIG. 7 for a further possible embodiment of the invention.

According to FIG. 8, the enclosing or enveloping of the nanofiber material using polyaniline may also be performed by and/or mixing with EB (emeraldine base) and NH—$_4$OH (sal ammoniac).

Experiments have shown that the nanofibers thus enclosed using EB have a good solubility in various solvents and/or dispersants, such as ethylene glycol, polyethylene glycol, NMP, THF, and DMF, and result in a stable dispersion and/or a stable product, having a blue color. The experiments have also shown, however, that a reduction of the thermal resistance $R_{th}$ does not occur in particular even if pretreated (TC pretreatment) nanofibers are used, for a desired low thermal resistance $R_{th}$, the proportion of nanofibers or nanofiber material in the composition must thus be increased.

In the following Table 7, the measured thermal resistances $R_{th}$ (1° K/W) are again specified for four samples 1-4, the samples 1-3 each containing 5 wt.-% of nanofibers in the PEG matrix and the sample 4 10 wt.-% nanofibers. All samples were produced by mixing the nanofibers over 30 minutes at 40° C. in an ultrasound bath, sample 1 using non-pretreated nanofibers, sample 2 using non-pretreated nanofibers, but nanofibers enveloped according to FIG. 8 using polyaniline, and samples 3 and 4 using nanofibers pretreated (TC pretreatment) and enveloped using polyaniline according to FIG. 8.

TABLE 7

| Sample | Thermal resistance $R_{th}$ (° K/Wt) | Improvement in % |
|---|---|---|
| Sample 1 | 0.0270 | |
| Sample 2 | 0.0248 | 8.75 |
| Sample 3 | 0.0273 | −1.13 |
| Sample 4 | 0.0220 | 22.54 |

It may be seen from the preceding Table 7 that a significant reduction of the thermal resistance only occurs in pretreated nanofibers and nanofibers enveloped according to the formula of FIG. 8 using polyaniline at a proportion of nanofibers lying significantly above 5 wt.-%.

Figure 9:
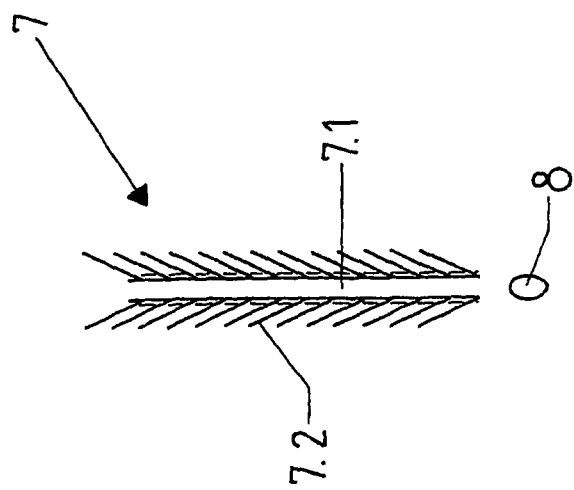
FIG. 9 shows a simplified illustration of a partial length of a nanofiber available under the identification ENF100 and produced using nickel as a catalyst.

FIG. 9 schematically shows a partial length of the nanofiber ENF-100-HT identified in general in this figure by 7, together with its coiled catalyst 8 used during the production. As shown, the nanofiber 7 is implemented as internally tubular and/or has a tubular structure 7.1 therein and has a scaly structure 7.2 on the external surface, so that the entire external surface or nearly the entire external surface of the nanofiber 7 offers the possibility of bonding and/or docking further components.

Figure 10:
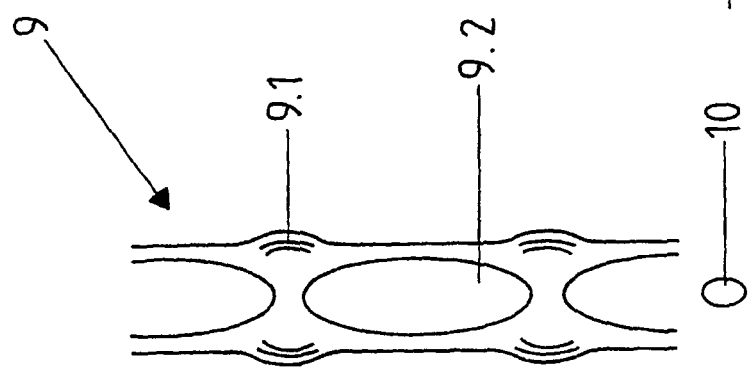
FIG. 10 shows, in an illustration like FIG. 9, a carbon nanofiber available under the identification HTF110 and produced using iron as a catalyst.

FIG. 10 shows a schematic illustration of a partial length of the nanofiber HTF-110 identified therein generally by 9, together with its iron catalyst 10 used for the production.

The nanofiber 9 has a structure like a stalk of bamboo having nodes or thickened places 9.1 spaced apart from one another in the fiber longitudinal direction on the external surface and having cavities 9.2, closed per se and sequential in the fiber longitudinal direction, in the interior of the fiber. Only the nodes 9.1 offer the possibility for coupling and/or docking further components.

A method was already described in connection with FIG. 2, in which the nanofibers and especially also the nanofibers 7 were first treated using an inorganic acid and subsequently using thionyl chloride, so that carboxyl groups form at least on the external surface of the nanofibers, in which the OH groups are replaced by chlorine atoms by the thionyl chloride treatment and/or hydrogen halide bonds are formed.

Figure 11:
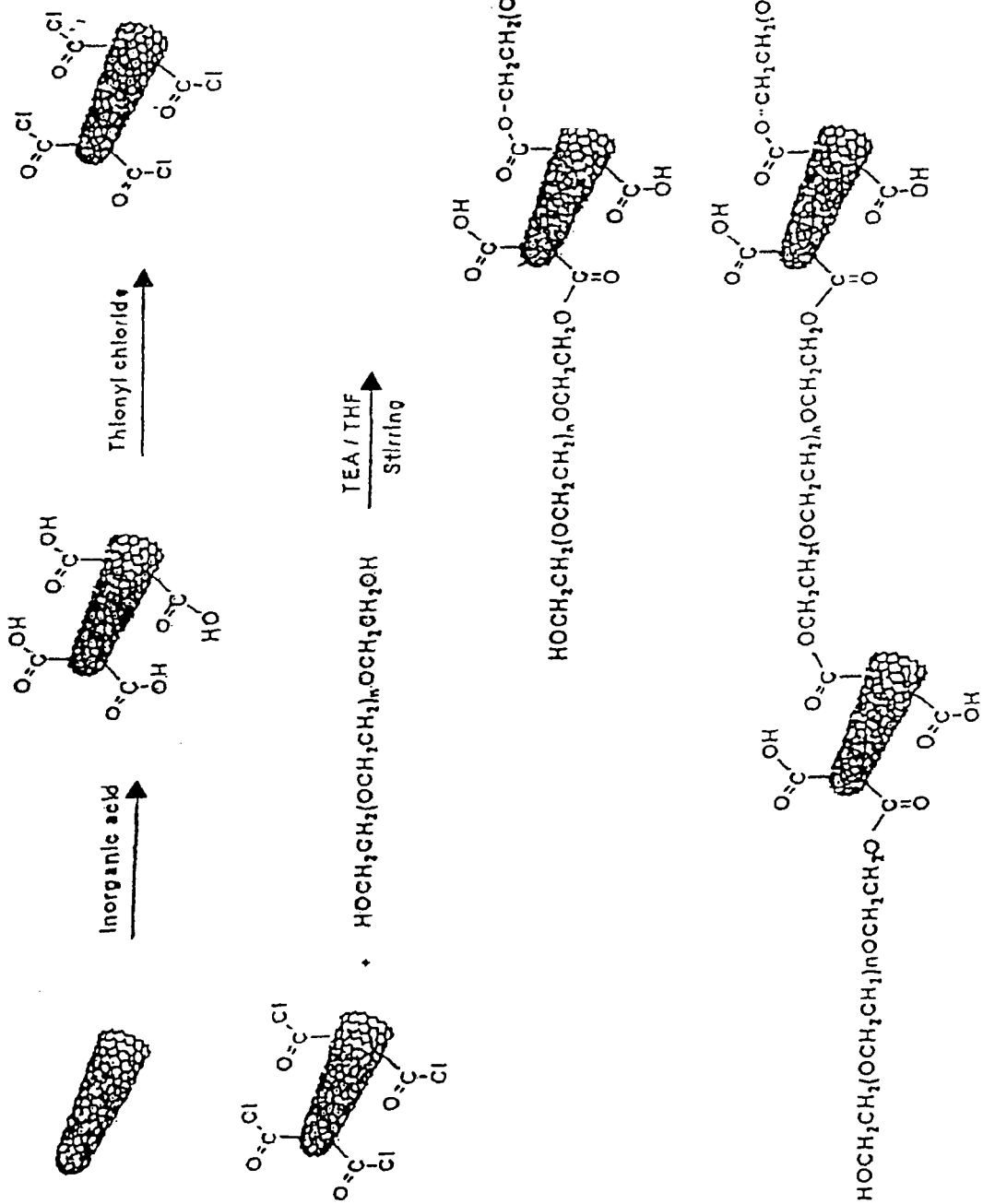
FIG. 11 shows, in an illustration like FIG. 2, the method steps of a method modified in relation to FIG. 2 using the carbon nanofiber from FIG. 9.

FIG. 11 shows a refinement of this method in that the nanofibers are not introduced into the PEG matrix and/or mixed with this matrix material after this TC treatment, as in the example of FIG. 2, but rather are first treated in a further method step using polyethylene glycol (PEG) diluted by a suitable solvent, with continuous stirring over multiple days. Only the nanofibers thus pretreated are then introduced into the PEG matrix and/or mixed therewith, for example, again in an ultrasound bath using a treatment time of 30 minutes and at a temperature of 40° C. and in such a quantity that the proportion of nanofibers in the matrix is approximately 5 wt.-%.

The thermal resistance $R_{th}$ for various compositions or samples, which each contained the nanofiber ENF-100-HT in the PEG matrix, in a proportion of 5 wt.-% in relation to the total weight of the composition, is specified in the following Table 8.

TABLE 8

| Sample | $R_{th}$ (° K/Wt) | Improvement |
|---|---|---|
| Sample A | 0.027 | |
| Sample B | 0.0208 | 29.9% |
| Sample C | 0.01581 | 70.8% |

Sample A contains the untreated nanofiber ENF-100-HT in the PEG matrix. Sample B contains the TC-pretreated nanofiber material without further pretreatment, and sample C contains the nanofiber material pretreated according to the method described above in connection with FIG. 11. The measurements of the thermal resistance $R_{th}$ were again performed using the configuration of FIG. 1, specifically using a heating voltage of 60 V and a heating current of 2.7 A on the electrical heater 2, and using a contact pressure of 3 bar generated on the layer 6 between the plates 3 and 4.

The improvement of the thermal conductivity by the pretreatment according to FIG. 2, in particular according to FIG. 11, however, is primarily to be attributed to the nanotubes and/or nanofibers having an optimal thermal conductivity in the longitudinal direction, but the thermal conductivity being strongly reduced in the transverse direction in untreated nanofibers and/or nanotubes, in particular also a high heat transfer resistance existing between the laterally touching nanofibers and/or nanotubes. The nanofiber material is incorporated optimally in the matrix by the pretreatment, so that the thermal conductivity and/or the heat transfer between adjacent nanofibers or nanotubes is also significantly reduced in the nanotube or nanofiber transverse direction.

Figure 12:
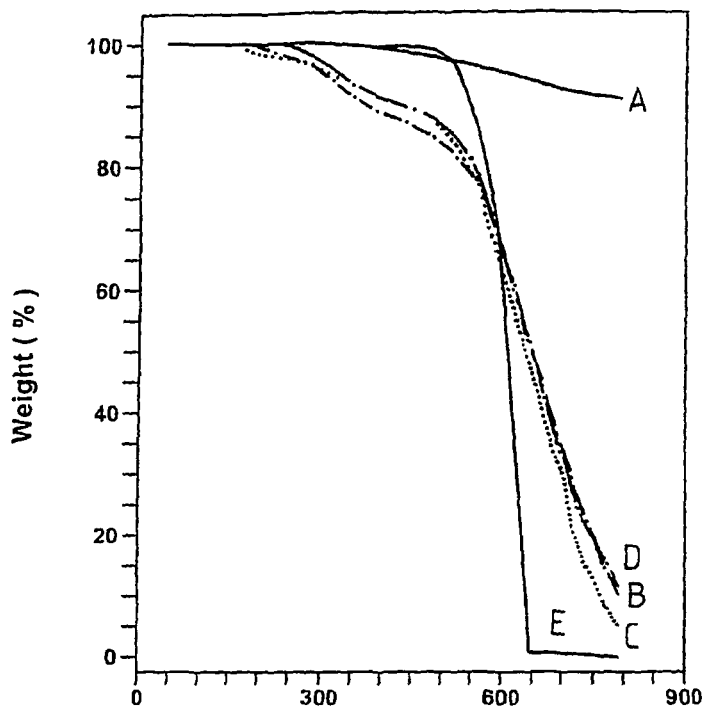
FIG. 12 shows a thermogram (mass decomposition as a function of the temperature—TGA diagram hereafter) for the carbon nanofiber ENF100-HT in the untreated state and in the treated state, each measured in oxygen-free nitrogen atmosphere.

FIG. 12 shows a TGA diagram of the mass decomposition as a function of the temperature for various compositions A-D. The following compositions are to be assigned to the curves A-D in this diagram, the proportion of nanofiber material again being 5 wt.-%:

curve A: TC-pretreated nanofiber material ENF-100-HT, i.e., nanofiber material according to the pretreatment of FIG. 2;
curve B: nanofiber material ENF-100-HT pretreated according to the method of FIG. 11 in the PEG matrix;
curve C: nanofiber material ENF-100-HT pretreated according to the method of FIG. 2 in the PEG matrix;
curve D: nanofiber material ENF-100-HT in an ethylene glycol matrix;
curve E: nanofiber material ENF-100-HT without pretreatment and not in a matrix.

Curve A is of special significance, from which it results that the carboxylated and/or TC-pretreated nanofiber material has an extremely high temperature or fire resistance. This is apparently to be attributed to the catalyst residues, i.e., in the nanofiber ENF-100-HT the nickel residues, being removed and washed out by the pretreatment using the inorganic acid in particular, and in addition the halogen bonds which form through the pretreatment on the surface of the nanofiber material in particular, and/or their halogen chlorine having a flame-retardant effect. A similar effect is achievable by a treatment of the nanofiber material using boron or iodine. An improvement of the thermal resistance and/or temperature or fire resistance of the composition as a whole is also achieved by the halogens chlorine, boron, and iodine.

Furthermore, an improvement of the temperature or fire resistance of graphite in general may be achieved by a treatment corresponding to the treatment of FIG. 2 or a corresponding iodine or boron treatment, also corresponding to curve A.

The carboxyl treatment or the treatment using boron or iodine of graphite thus opens up the possibility of improving greatly varying products made of graphite in regard to their fire resistance and/or heat or flame resistance in such a manner, for example, also the service life and/or burn-off resistance of brushes of electrical commutator motors, etc., which are generally produced from graphite.

Figure 13:
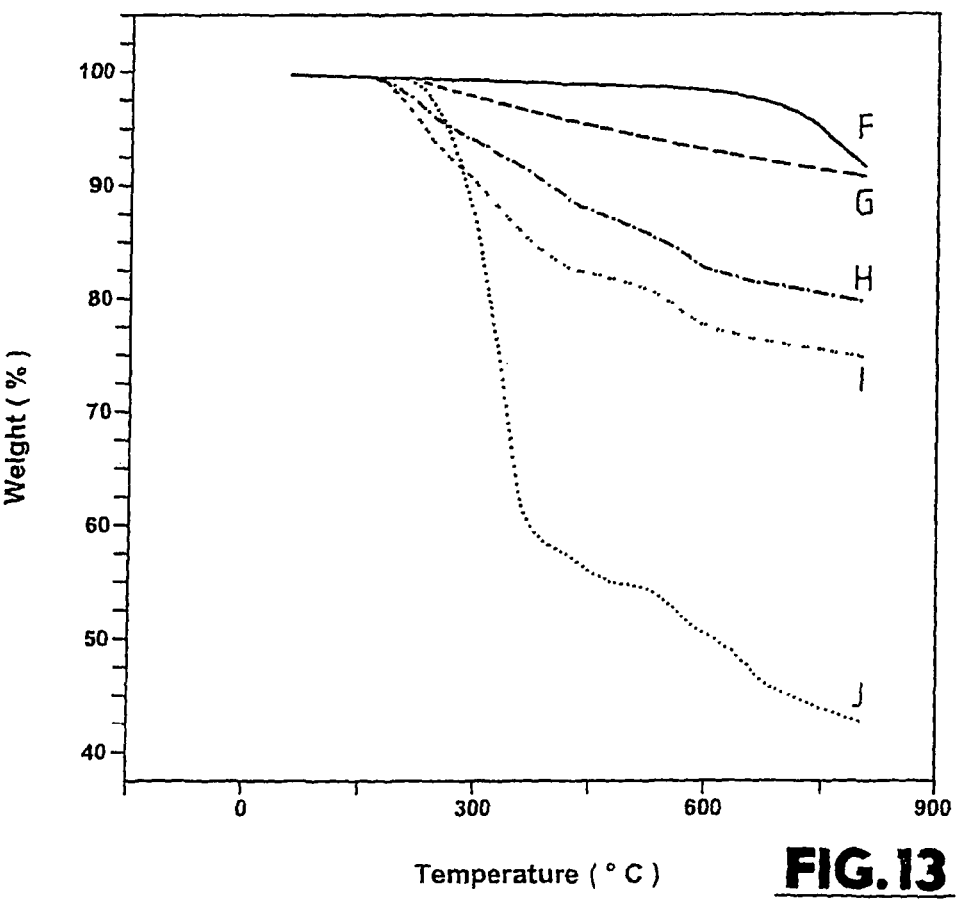
FIG. 13 shows a TGA diagram of various samples based on the nanofiber pristine HTP-110 FF-LT.

FIG. 13 shows a TGA diagram of the mass decomposition as a function of the temperature, again for various compositions F-J. In this diagram, the following compositions are to be assigned to the curves, pristine HTP-110FF-LT having been used as the nanofiber material:

curve F: untreated nanofiber material,
curve G: carboxylated nanofiber material,
curve H: nanofiber material treated using ethylene glycol,
curve I: nanofiber material treated using PEG,
curve J: nanofiber material treated using PEG monolaurate.

It is obvious from the diagrams of FIG. 13 that sample H has the lowest weight loss at the maximum temperature of the measurement.

The measured values may be summarized as follows:

TABLE 9

| Sample | Time (hours) | Temperature (° C.) | Maximum temperature | Wt.-% |
|---|---|---|---|---|
| H | 48 | 80 | 182 | 8 |
| I | 48 | 80 | 180 | 13.23 |
| J | 48 | 80 | 215 | 39.8 |

Furthermore, the solubility of samples H, I, and J was measured in various solvents, specifically chloroform, acetone, THF, and distilled water. The solubility is summarized in the following table:

TABLE 10

| Sample | Chloroform | Acetone | THF | Distilled water |
|---|---|---|---|---|
| H | >5 days | >5 days |  | >5 days |
| I | <5 days | >5 days | >5 days | >5 days |
| J | <5 days | >5 days | >5 days | Insoluble |

The dispersions used for determining the solubility were produced by treatment with ultrasound over 30 minutes and at 30° C.

The measured values shown in FIG. 12 may be summarized as follows:

TABLE 11

| Sample | Time (hours) | Temperature (° C.) | Maximum temperature of the plastic nanofibers | Maximum of the decomposition temperature | wt.-% |
|---|---|---|---|---|---|
| B | 48 | 80 | 548 | 266 | 10 |
| C | 48 | 80 | 556 | 213 | 13 |
| D | 48 | 80 | 536 | 170 | 10.5 |

$T_{max}$CNT is the maximum decomposition temperature of the nanofiber material and $T_{max}$ reagent is the maximum decomposition temperature of the treatment medium.

The solubility of the various samples in chloroform, acetone, THF, and in distilled water is summarized in the following Table 12:

TABLE 12

| Sample | Chloroform | Acetone | THF | Distilled water |
|---|---|---|---|---|
| B | >30 days | >30 days |  | >30 days |
| C | <5 days | >10 days | >10 days | >10 days |
| D | <5 days | >10 days | >10 days | Immiscible |

The corresponding dispersions were produced using an ultrasound treatment over 30 minutes and at 30° C.

Figure 14:
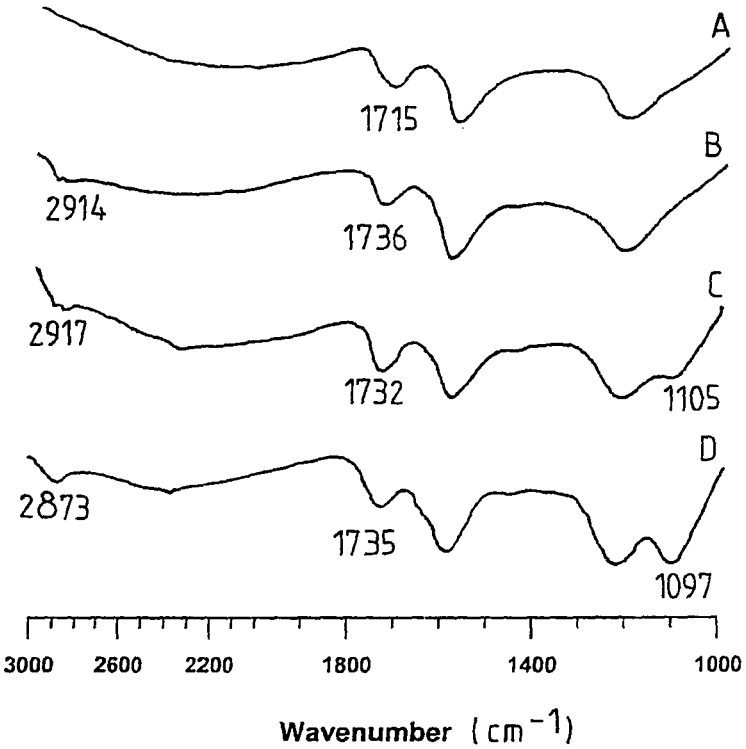
FIG. 14 shows the infrared spectrum of the nanofiber ENF-100 HT in the untreated state and in the treated state.
Figure 15:
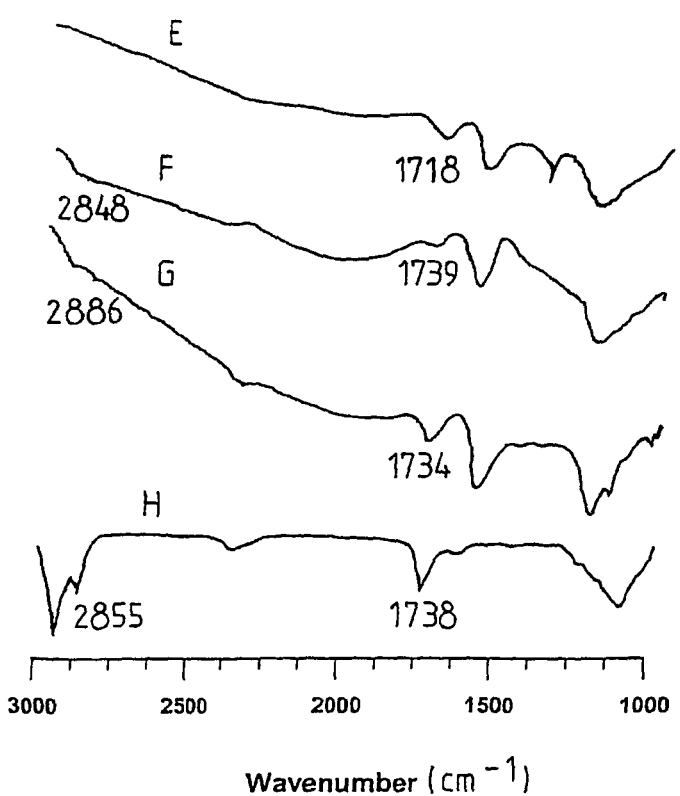
FIG. 15 shows the infrared spectrum of the nanofiber HTP-110 FF-LT upon different treatments.

FIGS. 14 and 15 show infrared spectra for various samples, in each case:

curve A: carboxylated and/or TC-pretreated nanofibers ENF-100-HT,
curve B: nanofibers ENF-100-HT pretreated using ethylene glycol, curve C: nanofibers ENF-100-HT pretreated using PEG monolaurate, curve D: nanofibers ENF-100-HT pretreated using PEG curve E: carboxylated and/or TC-pretreated nanofibers HTP-110FF-LHT, curve F: nanofibers HTP-110FF-LHT pretreated using PEG, curve G: nanofibers HTP-110FF-LHT pretreated using ethylene glycol, curve H: nanofibers HTP-110FF-LHT pretreated using PEG monolaurate.

Figure 16:
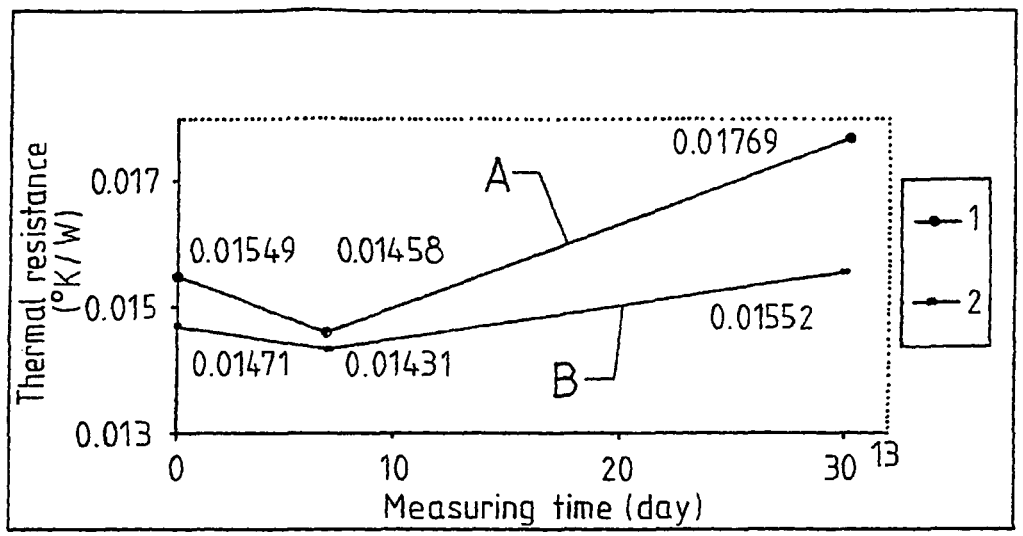
FIG. 16 shows the time change of the thermal resistance in a diagram.

FIG. 16 shows the chronological change of the thermal resistance $R_{th}$ of two different compositions, which each contained the nanofiber material in a PEG matrix. Curve A is the curve for a composition which contains nanofiber material HTP-110-LHT in untreated form. Curve B of FIG. 15 shows the chronological change of the thermal resistance $R_{th}$ for a composition which contains the nanofiber material pretreated according to FIG. 11 in a PEG matrix and especially nanofiber material having nanofibers of the type HTP-110FF-LHT.

Not only may the color of the composition be changed by adding suitable pigments and/or small molecules, but rather, inter alia, an improvement of the thermal conductivity and/or a reduction of the thermal resistance $R_{th}$ may also be achieved.

Figure 17:
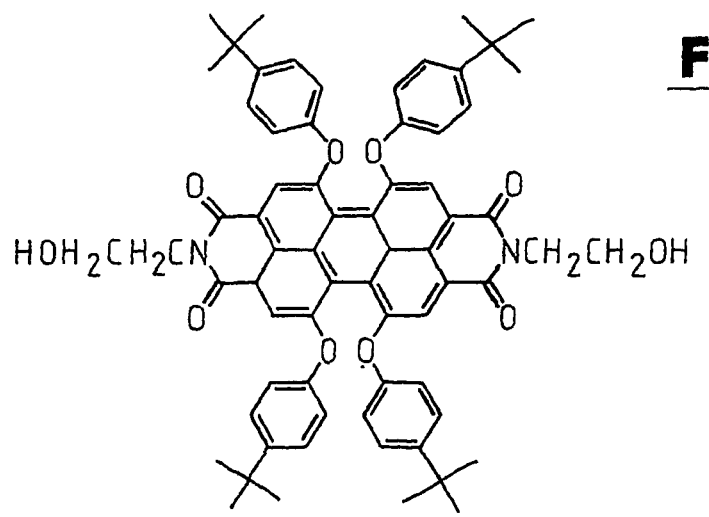
FIG. 17 shows the schematic illustration of a polymer suitable for dyeing the composition according to the invention (perylene)

The chemical formula for a pigment of this type, suitable for use in the composition according to the invention, is shown in FIG. 17 in the form of perylene. By adding this pigment, the composition receives a slightly reddish coloration.

The composition and the measured thermal resistance $R_{th}$ are specified in the following Table 13 for various specimens or samples. A nanofiber material HTP-150FF-HAT in a PEG matrix was used. The particular sample was produced by mixing in an ultrasound bath over 35 minutes and at 40° C. The values specified in Table 13 are each mean values from three individual measurements. The measurements were performed again using the configuration of FIG. 1, specifically using a heating voltage of 60 V, a heating current of 2.7 A, and a contact pressure of 3 bar.

TABLE 13

| Sample | Proportion of perylene in wt.-% | Proportion of nanofiber material in wt.-% | Proportion of matrix material | $R_{th}$ (°K/Wt) | Improvement |
|---|---|---|---|---|---|
| A | 0 | 5 | 95 | 0.01673 | |
| B | 2.5 | 5 | 92.5 | 0.01928 | −13.2 |
| C | 1 | 5 | 94 | 0.01595 | +4.8 |
| D | 0.5 | 5 | 94.5 | 0.0187 | −10.5 |

At a perylene proportion between 0.5 and 2.5 wt.-%, worsening of the thermal conductivity of the composition occurs which is still in the scope of permissibility. At a perylene proportion of approximately 1 wt.-%, an improvement of the thermal conductivity is even achieved, however.

A special, particularly advantageous embodiment of the invention provides that the nanotubes or nanofibers of the nanofiber material are coated by a polymer used as a surface adhesive and the nanofiber material is then coated using nanoparticles made of a ferromagnetic material, for example, using nanoparticles made of γ-Fe$_2$O$_3$. For example, polyaniline is suitable as the adhesive base. The nanofiber material is untreated or was subjected to a pretreatment, for example, such as a pretreatment corresponding to FIG. 2 or 11. FIG. 18 shows, in position A, this coating of the nanofibers, for example, the nanofiber 7 of the type ENF100-HT using the ferromagnetic material γ-Fe$_2$O$_3$.

Position B of FIG. 18 shows how the thus ferromagnetic nanofibers 11 having an initially arbitrary course and/or an initially arbitrary configuration and shaping, for example, having a coiled shaping typical for the nanofiber ENF100-HT, are oriented along the magnetic lines by an external magnetic field (illustrated by the arrow H).

Manifold applications open up in this manner. Thus, for example, it is possible using ferromagnetically coated nanofibers 11 or nanotubes of this type to produce a thermal grease using a suitable matrix material, which is provided in case of application in the typical manner at the transition or connection area between two adjacent heat-transmitting surfaces, for example, between a surface to be cooled and a surface of a heatsink. After the application and possibly after the bonding or connection of the two surfaces, the nanofibers in the thermal grease and/or in the composition are oriented by an external magnetic field in such a manner that they are oriented having their longitudinal extension in the direction of the heat flow and thus an optimum thermal conductivity 1/$R_{th}$ is achieved. The ferromagnetically coated nanofibers oriented in the external magnetic field are then fixed in this orientation by curing or polymerization of the matrix.

The material used for the matrix is selected, for example, in such a manner that it is hard or rubber-elastic in the cured or polymerized state, so that in the latter case thermally caused spacing and/or length changes and/or relative and/or equalization movements between the areas provided for the heat transfer are possible. For example, plastics which cure at ambient temperature are suitable as the matrix, in particular also elastomeric plastics, also those made of multiple components, plastic which cures through the effect of heat or UV light, etc.

Materials may also be produced using the ferromagnetically coated nanofibers 11, by the orientation of these fibers in an external magnetic field, which have an increased thermal conductivity in a predefined or preferred axial direction, possibly also have an increased electrical conductivity via the oriented nanofibers, the ferromagnetically coated nanofibers 11 being frozen and/or fixed in their state oriented by the external magnetic field by curing the corresponding matrix or by a correspondingly high viscosity of the matrix material. Thus, for example, the production of plates also having rubber-elastic properties is possible in this manner, which are then provided instead of or in addition to a thermal grease as the transition or terminal material between two surfaces adjacent to one another in a heat flow path.

By situating the ferromagnetically coated nanofibers in a liquid or viscous matrix, the thermal conductivity or the electrical conductivity may also be controlled by applying or changing one or more external magnetic fields, for example, in a module controlling the electrical conductivity and/or the thermal conductivity, etc.

A method, using which the coating of the nanofiber material with γ-Fe$_2$O$_3$ may be performed, is shown in FIG. 19.

Figure 20:
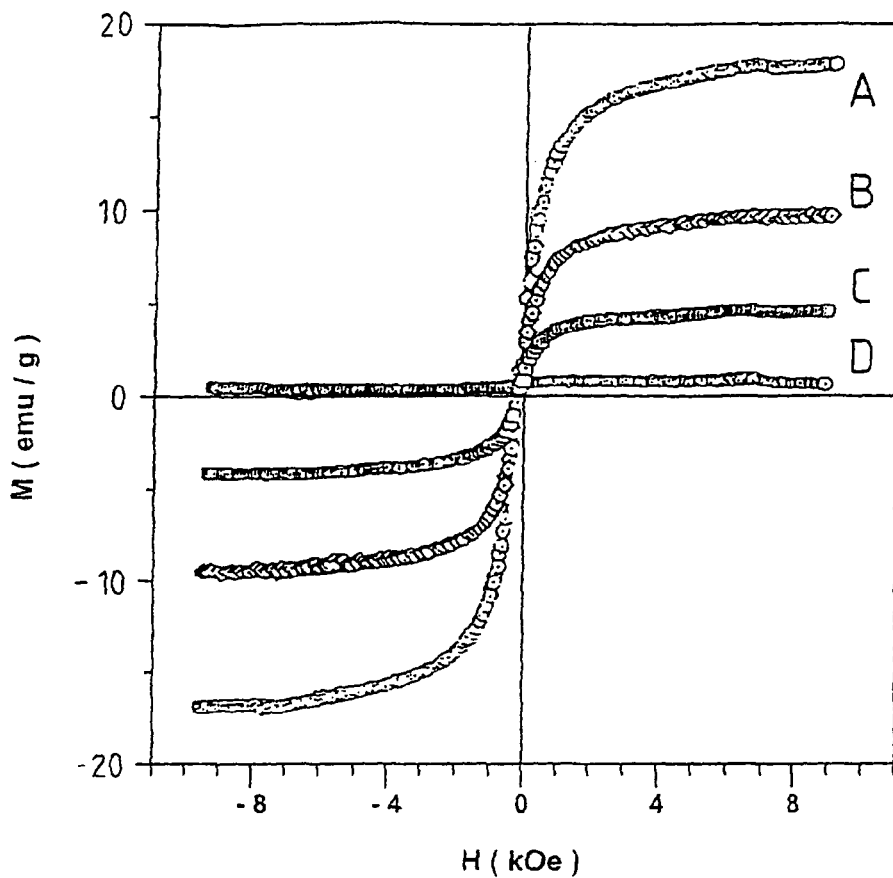
FIG. 20 shows the magnetization curves measured on various samples of the nanofiber material coated with γ-$Fe_2O_3$.

FIG. 20 shows a magnetization diagram of the magnetization M as a function of the magnetic field strength H, the magnetization M being specified as a specific magnetization program. Furthermore, the magnetization M is a function of the proportion of Fe$_2$O$_3$ in wt.-%. HTP-150FF-LT is used as the nanofiber material, having a different proportion (in wt.-%) of Fe$_2$O$_3$ in each of curves A, B, and C. Curve D relates to the nanofiber material pristine HTP-150FF-LT without Fe$_2$O$_3$. Other ferromagnetic materials are also suitable for coating the nanofiber material, such as cobalt.

Figure 21:
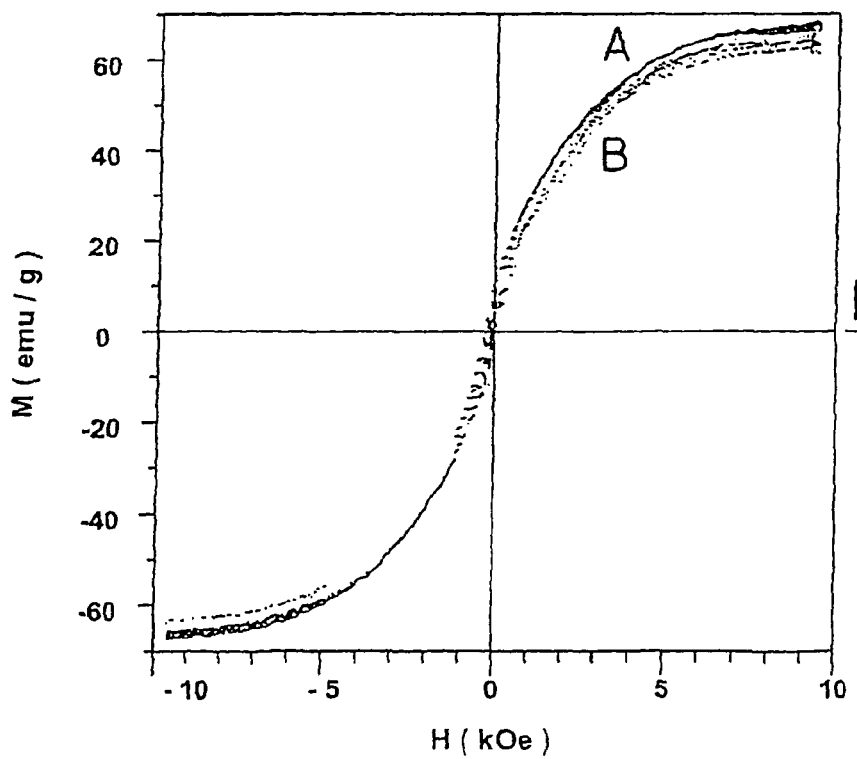
FIG. 21 shows the magnetization curves measured on various samples of the nanofiber material coated with cobalt.

FIG. 21 again shows a comparison of the magnetization curve of the nanofiber material coated with iron oxide (curve B) and the magnetization curve of the nanofiber material having cobalt (curve A). The nanofiber material is again pristine HTP-150FF-LT.

Because of the outstanding magnetic properties, the ferromagnetically coated nanofiber material is suitable for multiple further applications in addition to the applications already cited above, for example, in storage media for greatly varying applications, e.g., in electrical and electronic devices, e.g., for storing data of greatly varying types, in the medical field, in particular for diagnostic applications, etc.

The nanofiber material coated using the ferromagnetic material, which permits high magnetization at low weight, does have a reduced thermal conductivity in the original state in comparison to the uncoated nanofiber material, but this may be increased very significantly by orienting the ferromagnetic nanofibers in the magnetic field, so that the conductivity is then well above that which the non-ferromagnetically coated nanofiber material has.

Figure 22:
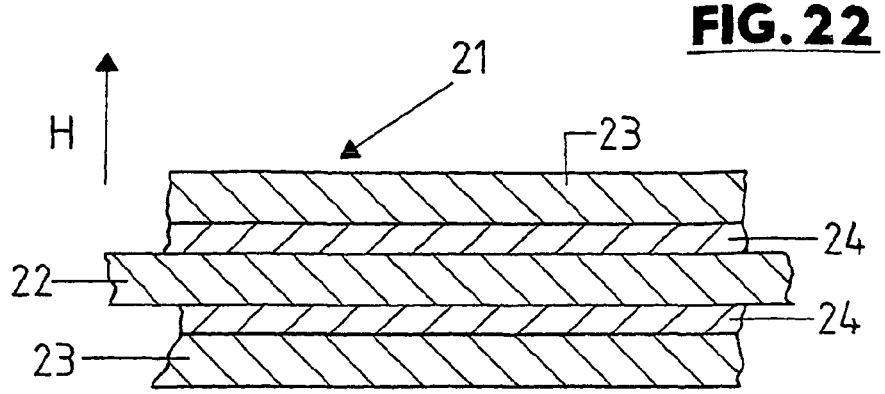
FIGS. 22 and 23 each show a simplified illustration of a section-through a composite material according to the invention.

In FIG. 22, 21 is a multilayer material which is suitable, for example, as a circuit board for electrical circuits or modules. The multilayer material comprises a plate-shaped carrier or substrate 22, which is manufactured in this embodiment as a whole from an electrically insulating material, e.g., from a ceramic, such as aluminum oxide ceramic, aluminum nitride ceramic, silicon nitride ceramic, etc. Other materials are also conceivable for the substrate 22, such as plastic, for example, based on epoxy, etc.

A metal plating 23, formed by a thin metal plate or film, for example, by a copper plate or copper film, is provided flatly on a surface side of the substrate 22. This metal plating 23 is bonded flatly to the substrate 22 via an adhesive or bond layer 24 formed by an adhesive or a bonding material. In the illustrated embodiment, the substrate 22 is provided with a metal plating 23 on both surface sides. The composite or multilayer material 21 is thus symmetrical in relation to a central plane of the substrate 22 at least in regard to the type and sequence of the individual layers. Fundamentally, however, it is also possible to provide the metal plating 23 on only one surface side of the substrate 22. To produce the printed conductors, contact areas, etc., at least the metal plating 23 on a side of the substrate 22 is then to be structured appropriately using the typical known etching and masking technologies.

Figure 23:
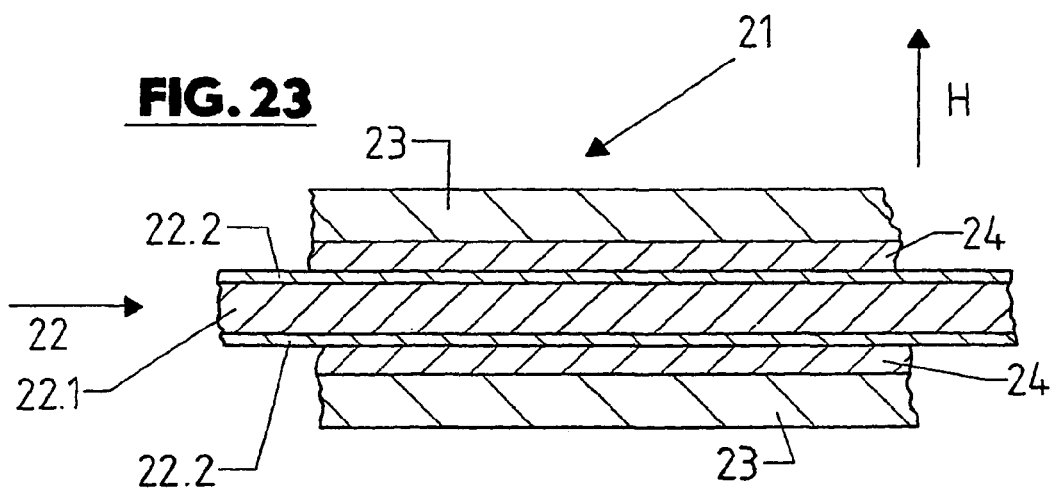

As shown in FIG. 23, it is further also possible to implement the substrate 22 per se as multilayered, comprising a metallic carrier layer 22.1 made of aluminum, for example, and an insulating layer 22.2 on the surface sides of the plate-shaped substrate 22, specifically where a metal plating 23 adjoins via a bonding layer 24.

A special feature of the multilayer product 21 is that the bonding layer 24 is formed by a composition according to the invention, in which the matrix is formed by a matrix component suitable as an adhesive, for example, an epoxide resin matrix, and the pretreated nanofiber material is contained in this matrix, so that an extremely low thermal resistance $R_{th}$ and/or vice versa a high thermal conductivity $1/R_{th}$ results for the bonding layer 24. The multilayer material 21 having a substrate 22 made of an aluminum oxide ceramic is thus entirely comparable in regard to the thermal conductivity and/or the thermal resistance between the upper and lower metal plating 23 to a multilayer material in which the metal plating is applied to the ceramic substrate using the DCB method, as explained in greater detail in the following. The matrix contains approximately 5 to 30 wt.-% of nanofiber material in relation to the total weight of the adhesive or bonding material.

In a preferred embodiment, a carbon nanofiber commercially available under the identification "Pyrograf III" is used as the nanofiber material. This nanofiber is baked at 3000° C. before mixing into the matrix, possibly also before a pretreatment. A matrix based on epoxy, such as polyester, is used as the matrix. To obtain optimal incorporation of the nanofiber material in the matrix material, inter alia, a solvent is used. Triethylene glycol monobutyl ether is particularly suitable for this purpose.

Figure 24:
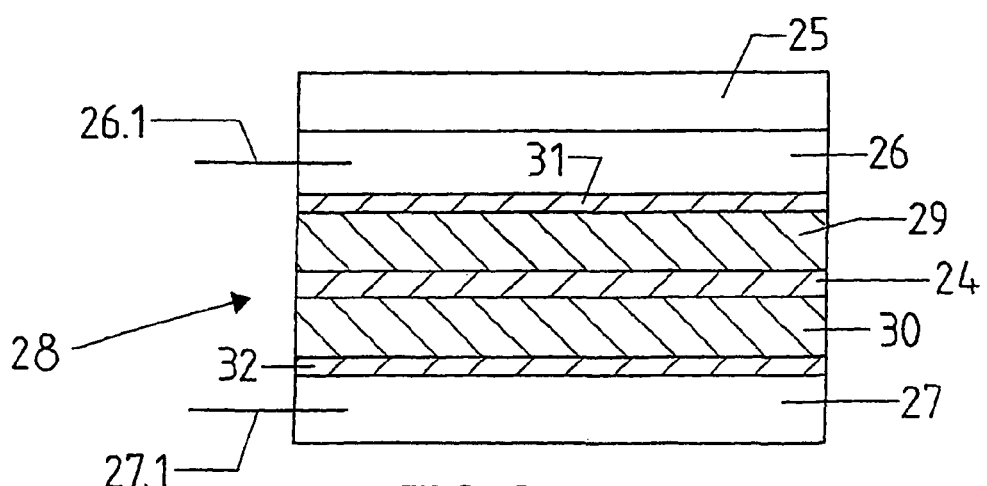
FIG. 24 shows a schematic illustration of a measuring configuration for determining the thermal behavior of a composition implemented as an adhesive and/or of a thermal adhesive according to the invention.

FIGS. 24 and 25 schematically show a configuration for measuring the thermal resistance caused by the bonding layer 24 once again. The configuration comprises an upper heating plate 25, a measuring plate 26, adjoining the heating plate and optimally bonded thereto for heat transfer, and a lower measuring plate 27. Temperature sensors 26.1 and 27.1 are provided on the measuring plates 26 and 27, respectively, with the aid of which the temperature of these plates may be exactly detected and relayed as measured values to measurement or analysis electronics. The heating plate 25 is electrically operated, for example, using a heating voltage of 60 V and using a constant heating current of, for example, 2.7 A, so that a precisely defined, constant quantity of heat is generated during the measurement procedure by the heating plate 25.

The particular blank 28 is situated between the two measuring plates 26 and 27, which comprises two copper plates 29 and 30, which are bonded to one another via a cured bonding layer 24. To achieve heat transfer between the blank 28 and the measuring plates 26 and 27 which is as low loss as possible, a layer 31 or 32 made of a typical thermal grease, in particular also known in regard to its properties, is provided between each of the measuring plates 26 and 27 and the adjacent plates 29 and 30.

The thermal resistance $R_{th}$ is defined as follows:

$$R_{th}(° K/W) = (T1-T2)/\text{power of the heater 5 in W}.$$

The thermal conductivity is then $1/R_{th}$.

FIG. 26 shows a graph of the thermal resistance $R_{th}$ in ° K/W ascertained during the measurement for various samples, specifically:

position A: with plates 9 and 10 lying one on top of another and not bonded by the bonding layer 4;

position B-E: each with plates 9 and 10 bonded to one another via the bonding layer 4, however:
  position B: without further temperature treatment;
  position C: with a treatment of the sample 8 over 2.8 days at a temperature of 120° C.;
  position D: with the treatment of the sample 8 over 6 days at a temperature of 120° C.;
  position E: with a treatment of the sample 8 over 1 day at 160° C.

FIG. 26 shows that the thermal conductivity of the bonding layer 24 improves with a longer temperature action, apparently by further curing of this layer. The measurements have further shown that the thermal resistance $R_{th}$ measured on the particular sample 28 only decreases slightly initially, i.e., in an initial phase of each measurement, apparently caused by inertia of the measuring system, but then remains constant after passage of this initial phase.

FIG. 27 shows a comparison of the thermal resistance of a copper-ceramic multilayer material. For this measurement, instead of the sample 28 having the two copper plates 29 and 30, samples were used in which the lower copper plate 30 is replaced by a ceramic plate or a ceramic substrate of equal size. In FIG. 24, the thermal resistance $R_{th}$ (° K/W) of the sample in which the upper plate 29 made of copper presses against the lower plate 30 made of ceramic (aluminum-oxide ceramic) without bonding is shown in position A. Positions B and D relate to measurements in which the upper plate 29 made of copper is bonded to the lower plate 30 made of ceramic via the bonding layer 24, specifically
position B—with a treatment of the sample 28 over 3 days at a temperature of 150° C. and positions D-E without a further treatment of the sample 28.

Position C shows a comparison of the thermal resistance of a DCB substrate. Position E is the thermal resistance measured using the measuring device of FIG. 21, which results without a sample 28, i.e., with measuring plates 26 and 27 pressing directly against one another via the layers 31 and 32.

It is obvious that plates 29 and 30 of identical size were used in all measurements.

The thermal conductivity of the bonding layer 24 may also be significantly increased in that the nanofibers of the nanofiber material used are optimally selected in regard to their length, i.e., these fibers or at least a majority of these fibers have a length between 1 and 100 μm, preferably 10 μm. This length corresponds to the surface irregularities typically present in ceramic substrates and/or copper films, so that these irregularities may be bridged as optimally as possible using nanofibers of these lengths.

The nanofiber material is pretreated in the manner described above and optimally incorporated in the matrix forming the bonding material by this pretreatment.

A further improvement of the thermal conductivity of the bonding layer 24 and thus an improvement of the thermal properties of the multilayer material 21 is achieved in that the nanofibers or nanotubes are oriented at least in a majority in the direction of the heat flow, for example, in that the nanofibers or nanotubes are implemented as ferromagnetic in the manner described above before the introduction in the matrix, i.e., are coated using the nanoparticles made of the ferromagnetic material. During production of the multilayer material 21, an optimal orientation of the nanofibers and/or nanotubes is then performed by an external magnetic field (arrow H) in such a manner that these nanofibers and/or nanotubes are oriented having their longitudinal extension perpendicular or at least approximately perpendicular to the surface sides of the substrate 22 and the adjacent metal plating 23 in the bonding layer 24. After the curing of the bonding layer 24, the nanofibers and/or nanotubes are fixed in this orientation.

A further improvement of the thermal properties of the multilayer material 21 may be achieved by a compression of the bonding layer 24 after the curing, for example, by hipping (HIP method) or by a treatment in vacuum, to thus close bubbles or cavities possibly present in the particular bonding layer 24.

The composition or the bonding material may be used not only for the production of multilayer materials or substrates, but rather also in general for all applications in which an adhesive bond between two components is required with simultaneous optimal heat transfer.

The bonding material is also electrically conductive due to the nanofiber material based on carbon, it may thus also be used optimally as an electrically conductive adhesive, i.e., wherever an electrical connection by gluing is desired or necessary, for example, when equipping circuit boards with components, etc.

Figure 28:
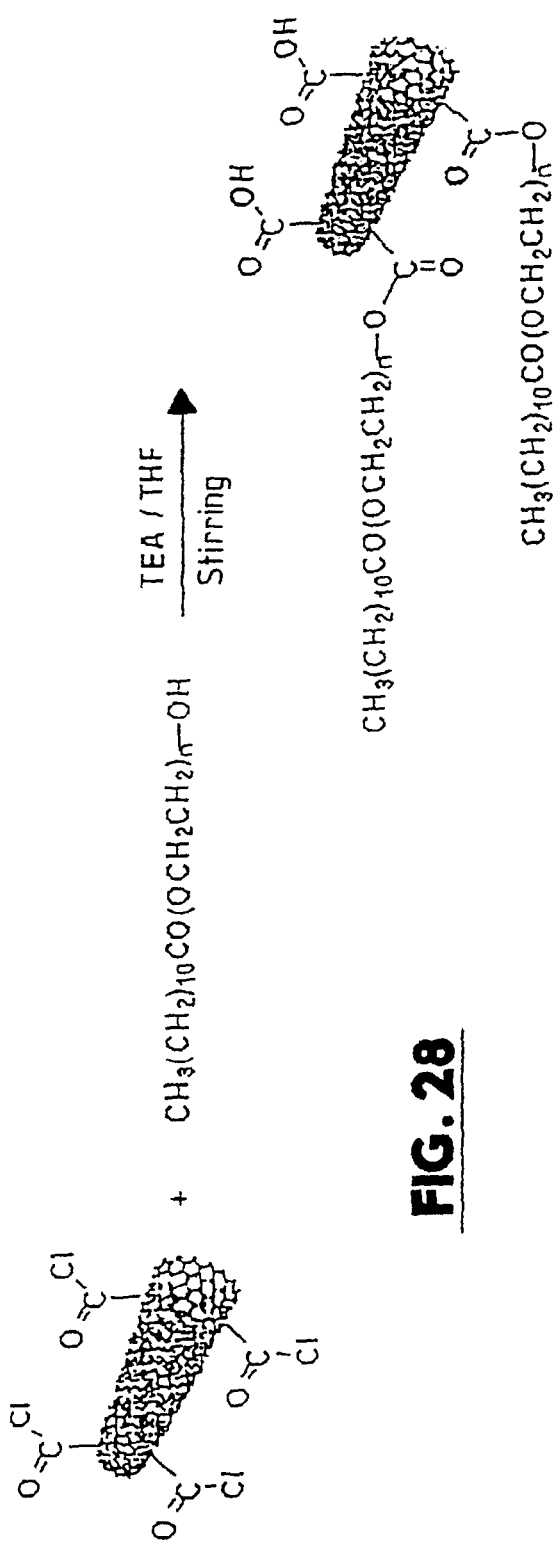
FIG. 28 shows the illustration of a method for further treatment of the carboxylated nanofibers using tetrahydrofuran (FHF) and triethylamine (TEA)

FIG. 28 again shows—starting from nanofibers treated on their surface corresponding to FIG. 2—a method for treating the nanofiber material, using tetrahydrofuran (THF) as the solvent and using triethylamine (TEA). Dispersions having high stability may be produced from the nanofiber material treated in this manner using suitable solvents, for example, the dispersions specified in the following Table 14:

TABLE 14

| Solvent | Stability |
| --- | --- |
| Dichloromethane | >1 week |
| Distilled water | >1 week |
| PEG | >1 week |
| Acetone | >1 week |

A very essential aspect of the invention comprises coating the nanofiber material using silver or silver particles (in particular also nanoparticles). A thermal pretreatment of the nanofiber material is necessary for this method, at a temperature at which the catalyst used for producing the nanofiber material vaporizes, i.e., at a temperature significantly above 1000 to 1500° C., preferably at a temperature in the range between 2500° C. and 3000° C., the temperature of the pretreatment lying more in the upper range of the spectrum.

Figure 29:
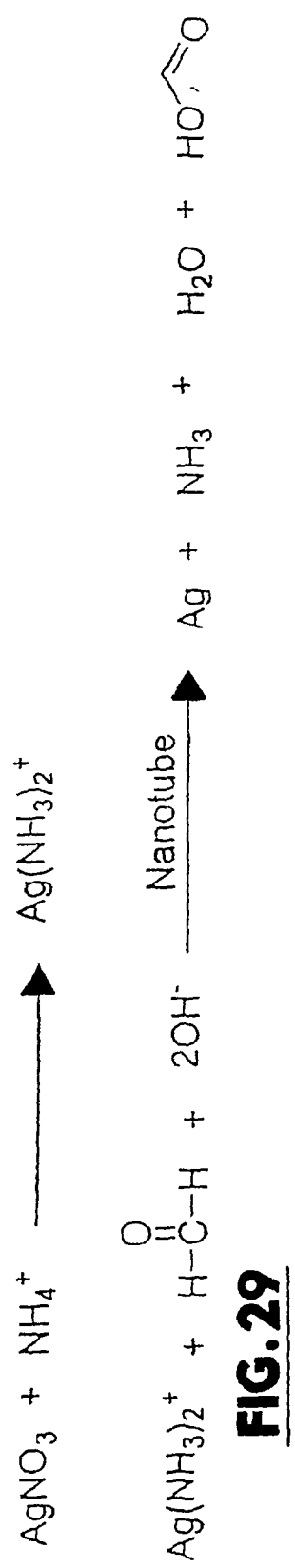
FIG. 29 shows the illustration of a method for the chemical coating of the nanofiber material with silver and/or with silver particles.
Figure 30:
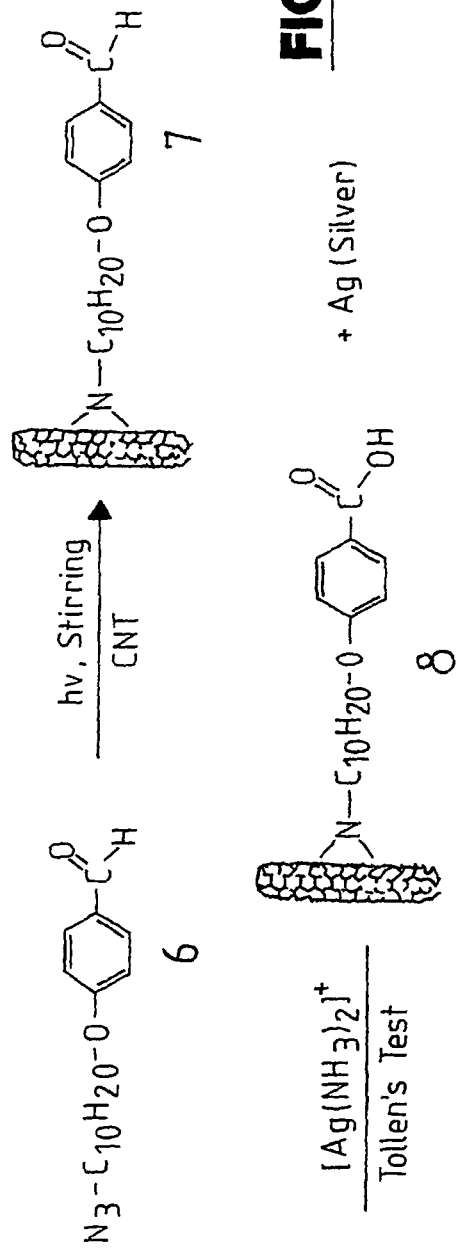
FIG. 30 shows the illustration of the method of FIG. 29 with pretreated nanofiber material.
Figure 31:
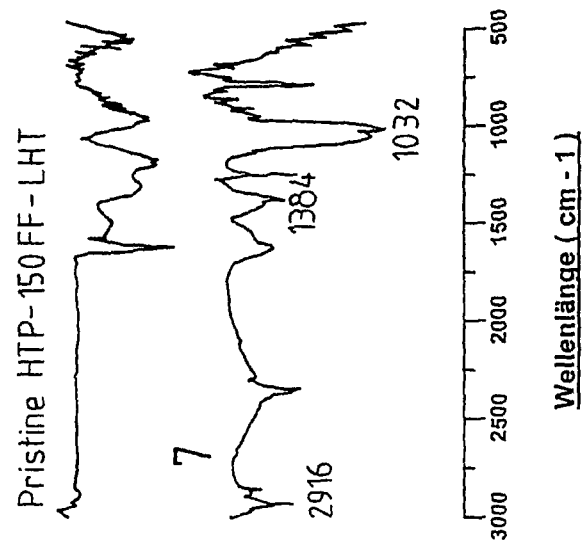
FIG. 31 shows the infrared spectrum of the nanofiber material pristine HTP-150FF-LHT pretreated according to the method of FIG. 30 in comparison to the infrared spectrum of the untreated nanofiber material pristine HTP-150FF-LHT.

The coating of the nanofiber material, i.e., the individual nanofibers or nanotubes made of carbon, with silver is performed, for example, in a chemical method. A method of this type is shown in FIG. 29, i.e., a deposition of silver by reduction. It has been shown that especially effective deposition of silver on the nanofiber material is achieved when this material was previously also subjected to a chemical surface treatment. FIG. 30 shows a corresponding method. For example, the nanofiber of the type pristine HTP-150FF-LHT is again used as the nanofiber. The infrared spectrum of the chemically treated nanofiber material (curve 7 therein) in comparison to the infrared spectrum of the untreated nanofiber material pristine HTP-150FF-LHT is shown in FIG. 31.

The following Table 15 relates to the dispersion of the nanofiber material coated using silver in water with a foaming agent.

TABLE 15

| Sample | Foaming agent | Proportion of foaming agent in mg | Proportion of nanofibers in mg | Distilled water in mg | Nanofiber residue in mg |
| --- | --- | --- | --- | --- | --- |
| 1 | Triton X | 3 | 32.9 | 25 | 7 |
| 2 | Sodium dodecyl sulfate | 3.2 | 34.2 | 25 | 4.1 |
| 3 | Sodium dodecyl benzylsulfate | 3.4 | 32.1 | 25 | 2 |
| 4 | Cetyl dimethylethyl ammonium bromide | 3.2 | 30 | 25 | 5.6 |
| 5 | — | — | 32.3 | 25 | 8.5 |

The thermal pretreatment preceding the silver treatment preferably occurs in multiple steps, firstly in a first purification step at a temperature in the range between 1000 and 1500° C., inter alia, to purify the nanofiber material from hydrocarbon, in particular polymerized hydrogens (hydrocarbons), which result, inter alia, from the production method of the nanofibers.

In a second method step, the nanofiber material is then purified of the catalyst used during its production, specifically by treatment and/or heating at approximately 3000° C. At least partial graphitization of the nanofiber material also occurs in this method step.

The chemical pretreatment of the nanofiber material then follows, to form chemical compounds on the surface of the nanofiber material, for example, to form carboxyl groups, which (chemical compounds) have an increased affinity to silver, so that an especially effective chemical deposition of silver as silver nanoparticles on the surface of the nanofibers and/or nanotubes is possible.

The nanofiber material coated using silver is suitable for greatly varying applications, in particular also for electrically conductive thermal greases or conductive adhesives, inter alia, with the advantage that the high silver proportion required until now in thermal greases or conductive adhesives of this type may be reduced by the silver-coated nanofiber material and thus the weight of such products may also be decreased.

Various compositions and in particular also their thermal and electrical conductivity are listed in the following Table 16, each also in relation to the thermal and electrical conductivity of the nanofiber material HTP-150FF-LT not coated with silver.

TABLE 16

| Sample | Nanofiber material wt.-% | Silver wt.-% | Thermal conductivity | Difference (%) | Electrical conductivity | Difference (%) |
|---|---|---|---|---|---|---|
| 1 | 100 | 0 | 1.1135 | — | 0.07289 | — |
| 2 | 90 | 10 | 1.1135 | 0 | 0.15485 | +112.4 |
| 3 | 65 | 35 | 1.1143 | +.07 | 0.11734 | +61 |
| 4 | 50 | 50 | 1.1514 | +3.3 | 0.1002 | +37.4 |
| 5 | 5 | 95 | 1.2811 | +15 | 0.00831 | −777 |
| 6 | 10 | 90 | 1.2608 | +13.2 | 0.02163 | −237 |
| 7 | 0 | 100 | 1.3138 | — | 0.00623 | — |

Each sample contained 0.2 g nanofiber material and 1.7 g $PEG_{(400)}$.

The thermal conductivity is specified in the preceding Table 16 as W/m° K and the electrical conductivity as S/cm.

Analogous to the coating with silver, the invention also provides enveloping the nanofiber material, i.e., the individual nanofibers and/or nanotubes, with a polymer material, such as polyaniline. The nanofiber material treated in this form is also suitable for manifold applications, for example, in electrically insulating thermal greases or in adhesives which conduct heat but are electrically insulating. A great advantage of these products is, inter alia, that during the manufacturing of electrical circuits, for example, which have components in high concentrations on a circuit board, for example, optimum cooling of components is possible using the electrically insulating thermal grease without the danger that thermal grease, which randomly reaches a surrounding circuit during the manufacture, for example, will cause short-circuits or other damage thereon.

As is obvious from Table 16, an optimal thermal conductivity with optimal electrical conductivity may be achieved by appropriate selection of the proportion of silver in relation to the proportion of nanofiber material.

The thermal conductivity and the electrical conductivity are shown as a function of the ratio between nanofibers and polymer (polyaniline) in the following Table 17 for various samples.

TABLE 17

| Sample | Aniline wt.-% | Nanofiber material wt.-% | Thermal conductivity | Electrical conductivity |
|---|---|---|---|---|
| 1 | 0 | 100 | 0.8552 | 0.0333 |
| 2 | 10 | 90 | 0.8002 | 0.00215 |
| 3 | 30 | 70 | 0.5261 | 0.00265 |
| 4 | 50 | 50 | 0.1347 | 0.008625 |
| 5 | 30 | 70 | 0.2753 | 0.000278 |

The thermal conductivity is again specified as W/m° K and the electrical conductivity in S/cm in the preceding Table 17.

These samples each contained 1 g nanofiber material pristine ENF-100-HT to 5.5 g $PEG_{(400)}$, but with different envelopes of the nanofiber material, namely:
  sample 1 nanofiber material (15 wt.-%) in $PEG_{(400)}$
  samples 2-4 nanofiber material with polyaniline in emeraldine salt form
  sample 5 nanofiber material with polyaniline in emeraldine base form Table 17 shows that at a specific ratio of proportions of the polymer (polyaniline) and the nanofiber material and with nanofibers pretreated in a specific manner, an optimum may be achieved in regard to the thermal conductivity and the highest possible electrical resistance, for example, in sample 5.

The invention was described above on the basis of an exemplary embodiment. It is obvious that numerous changes and alterations are possible without thus leaving the inventive idea on which the invention is based.

LIST OF REFERENCE NUMERALS 7 nanofiber of the type ENF-100-HT
7.1 tubular inner chamber of the nanofiber 7
7.2 scaly external surface of the nanofiber 7
8 nickel catalyst of the nanofiber 7
9 nanofiber of the type HTF-110
9.1 node section
9.2 cavities in the interior of the nanofiber 9
10 catalyst of the nanofiber 9
11 ferromagnetically coated nanofiber
21 multilayer material
22 substrate
22.1 carrier material
22.2 insulating layer
23 metal plating
24 adhesive or bonding layer
25 heating plate
26, 27 measuring plate
28 sample
29, 30 plate
31, 32 layer made of thermal grease

What is claimed is:

1. A circuit board for electrical circuits or modules, comprising:
    a first component in the form of a plate-shaped ceramic substrate;
    a second component in the form of a metal film; and
    an organic matrix intermediate adhesive bond layer bonding the first component to the second component, the intermediate adhesive bond layer being a composition consisting of an organic matrix component made up of an adhesive or bonding material and carbon-nanofibers, for heat transfer, the carbon-nanofibers being pretreated at a temperature in the range of between 1000° C.-3000° C., and wherein the organic matrix contains from 5 wt. %-30 wt. % carbon-nanofibers in relation to a total weight of the adhesive or bonding material.

2. The circuit board according to claim 1, wherein a majority of the carbon-nanofibers are oriented in an axial orientation perpendicular to adjacent surfaces of the first component and the second component.

3. The circuit board according to claim 2, wherein the carbon-nanofibers are ferromagnetic for the axial orientation by an external magnetic field.

4. The circuit board according to claim 3, wherein the carbon-nanofibers are ferromagnetic nanoparticles coated with a ferromagnetic material.

5. The circuit board according to claim 1, wherein the second component consists of copper.

6. The circuit board according to claim 1, wherein the second component is bonded to both sides of the plate-shaped ceramic substrate by said organic matrix intermediate adhesive bond layer.

7. The circuit board according to claim 1, wherein the first component is a ceramic substrate made of an aluminum oxide, aluminum nitride, or silicon nitride ceramic.

8. The circuit board according to claim 1, wherein the intermediate adhesive bond layer is compacted after curing by compression, by hipping or by treatment in vacuum.

9. The circuit board according to claim 1, wherein the carbon-nanofibers are pretreated at; a temperature of 3000° C.

10. The circuit board according to claim 1, wherein, the organic matrix component is epoxy or polyester.

* * * * *

UNITED STATES PATENT AND TRADEMARK OFFICE
CERTIFICATE OF CORRECTION

| | | |
|---|---|---|
| PATENT NO. | : 8,519,530 B2 | Page 1 of 1 |
| APPLICATION NO. | : 11/992649 | |
| DATED | : August 27, 2013 | |
| INVENTOR(S) | : Ka Chun Tse et al. | |

It is certified that error appears in the above-identified patent and that said Letters Patent is hereby corrected as shown below:

In the Claims

Column 22, line 11, cancel the text beginning with "9. The circuit board" to and ending "3000°C", and insert the following claim:

-- 9. The circuit board according to claim 1, wherein the carbon-nanofibers are pretreated at a temperature of 3000°C. --

Column 22, line 14, cancel the text beginning with "10. The circuit board" to and ending "or polyester", and insert the following claim:

-- 10. The circuit board according to claim 1, wherein the organic matrix component is epoxy or polyester. --

Signed and Sealed this
Thirteenth Day of May, 2014

Michelle K. Lee
*Deputy Director of the United States Patent and Trademark Office*